United States Patent
Zhao et al.

(10) Patent No.: US 11,038,280 B2
(45) Date of Patent: Jun. 15, 2021

(54) RADIO FREQUENCY SYSTEM

(71) Applicant: HUAWEI TECHNOLOGIES CO., LTD., Shenzhen (CN)

(72) Inventors: Hu Zhao, Shenzhen (CN); Hongwei Xing, Shenzhen (CN); Meng Chen, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 68 days.

(21) Appl. No.: 16/381,117

(22) Filed: Apr. 11, 2019

(65) Prior Publication Data

US 2019/0237881 A1 Aug. 1, 2019

Related U.S. Application Data

(63) Continuation of application No. PCT/CN2016/101822, filed on Oct. 11, 2016.

(51) Int. Cl.
*H01Q 21/00* (2006.01)
*H01Q 5/42* (2015.01)
*H04B 17/21* (2015.01)
*H04B 17/11* (2015.01)
(Continued)

(52) U.S. Cl.
CPC ........... *H01Q 21/0025* (2013.01); *H01Q 1/00* (2013.01); *H01Q 5/371* (2015.01); *H01Q 5/42* (2015.01);
(Continued)

(58) Field of Classification Search
CPC ........ H01Q 21/0025; H01Q 1/00; H01Q 5/42; H01Q 5/371; H04B 17/18; H04B 17/19;
(Continued)

(56) References Cited

U.S. PATENT DOCUMENTS

2012/0250518 A1 10/2012 Diab
2012/0257632 A1 10/2012 Wang et al.
(Continued)

FOREIGN PATENT DOCUMENTS

CN 101296123 A 10/2008
CN 101800684 A 8/2010
(Continued)

OTHER PUBLICATIONS

Antenna Interface Standards Group Standard No. AISG1: Issue 1.1 Control interface for antenna line devices, dated Jul. 30, 2004, total 56 pages.

*Primary Examiner* — Eugene Yun
(74) *Attorney, Agent, or Firm* — Maier & Maier, PLLC

(57) ABSTRACT

The present application discloses a radio frequency system, includes a detection device, at least one antenna line device, and an antenna that are sequentially connected in series by using a radio frequency channel. Each of the at least one antenna line device is configured to: receive a detection signal from the detection device or a previous antenna line device connected in series to the antenna line device; and add device information of the antenna line device to the received detection signal, and send, to the antenna or a next antenna line device connected in series to the antenna line device, the detection signal to which the device information is added. The detection device obtain device information of each of devices connected in series on a radio frequency line, to determine whether a connection relationship between the devices is correct, and determine a specific port location at which an error occurs.

16 Claims, 13 Drawing Sheets

(51) Int. Cl.
    *H01Q 5/371*     (2015.01)
    *H04B 17/18*     (2015.01)
    *H04W 24/04*     (2009.01)
    *H04B 17/19*     (2015.01)
    *H01Q 1/00*     (2006.01)
    *H04B 17/17*     (2015.01)

(52) U.S. Cl.
    CPC .............. *H04B 17/11* (2015.01); *H04B 17/18* (2015.01); *H04B 17/19* (2015.01); *H04B 17/21* (2015.01); *H04W 24/04* (2013.01); *H04B 17/17* (2015.01)

(58) Field of Classification Search
    CPC ........ H04B 17/21; H04B 17/11; H04B 17/17; H04W 24/04
    USPC ......................................................... 455/13.1
    See application file for complete search history.

(56) References Cited

U.S. PATENT DOCUMENTS

| | | | |
|---|---|---|---|
| 2012/0295554 A1* | 11/2012 | Greene | H01Q 1/50 455/77 |
| 2015/0009893 A1 | 1/2015 | Koyama et al. | |
| 2015/0327087 A1 | 11/2015 | Xu et al. | |
| 2017/0040682 A1* | 2/2017 | Lee | H04B 17/17 |
| 2017/0064570 A1 | 3/2017 | Shen et al. | |

FOREIGN PATENT DOCUMENTS

| | | |
|---|---|---|
| CN | 101835185 A | 9/2010 |
| CN | 102511180 A | 6/2012 |
| CN | 102647736 A | 8/2012 |
| CN | 103096467 A | 5/2013 |
| WO | 2015172307 A1 | 11/2015 |

\* cited by examiner

RADIO FREQUENCY SYSTEM

CROSS-REFERENCE TO RELATED APPLICATIONS

This application is a continuation of International Application No. PCT/CN2016/101822, filed on Oct. 11, 2016, the disclosure of which is hereby incorporated by reference in its entirety.

TECHNICAL FIELD

The present application relates to the field of wireless communications, and more specifically, to a radio frequency system.

BACKGROUND

Development of mobile communications is accompanied with an ever increasing demand for data services, and the communications industry is continuously searching for a method for expanding a data capacity. Increasing a capacity by adding a frequency band and using cell splitting has become a current trend. Accordingly, a quantity of antenna ports on a single site is increased, a quantity of devices in a feeder network is continuously increased, a quantity of base stations is increased, and consequently complexity of installing, configuring, and maintaining an antenna feeder system is increased. Whether a device connection topology is correct directly affects a function and performance of a network. In a later period, there are problems such as a long period and low problem detection determining accuracy during a network drive test. An auxiliary detection function of a primary device can be detected only in some scenarios. Because a connection relationship between links in a topology network cannot be obtained, a specific connection error location cannot be determined.

SUMMARY

Embodiments of the present application provide a signal transmission method in a radio frequency network, a radio frequency system, and an antenna line device, to obtain a device connection relationship in the radio frequency network.

According to a first aspect, a signal transmission method in a radio frequency network is provided. The radio frequency network includes a detection device, at least one antenna line device, and an antenna that are sequentially connected in series by using a radio frequency channel, and the method includes:

receiving, by each of the at least one antenna line device, a detection signal from the detection device or a previous antenna line device connected in series to the antenna line device; and adding, by the antenna line device, device information of the antenna line device to the received detection signal, and sending, to the antenna or a next antenna line device connected in series to the antenna line device, the detection signal to which the device information is added.

Therefore, the detection device can obtain device information of each of devices connected in series on a radio frequency line, to determine whether a connection relationship between the devices is correct, and determine, when a connection error occurs, a specific port location at which the error occurs.

Optionally, in an implementation of the first aspect, the method further includes:

receiving, by the antenna line device, a feedback signal from the antenna, where the feedback signal includes device information of the at least one antenna line device and device information of the antenna; and sending, by the antenna line device, the feedback signal to the detection device.

Optionally, in an implementation of the first aspect, the device information of the antenna line device includes port information of the antenna line device, or includes port information of the antenna line device and device type information of the antenna line device.

It should be understood that location information of each antenna line device in the at least one antenna line device connected in series may be, for example, a hop number. The hop number is used as an example. In a plurality of levels of devices connected in series, a first-level device has a hop number, and a second-level device has a hop number. Successively, each level of device has a hop number. A hop number of each device indicates a level of the device in the plurality of levels, in other words, a location of the device in the at least one antenna line device connected in series. For example, location information of a first antenna line device herein may be 1, and it indicates that the first antenna line device is a first-level device directly connected to the detection device; location information of a second antenna line device may be 2, and it indicates that the second antenna line device is a second-level device directly connected to the first antenna line device; and location information of the antenna may be 3, and it indicates that the antenna is a third-level device, that is, a last-level device.

In this way, the antenna line device may add, to the detection signal or the feedback signal, location information of the antenna line device in the at least one antenna line device connected in series, so that the detection device can obtain a location of the antenna line device on an entire link.

Optionally, in an implementation of the first aspect, the port information of the antenna line device includes a port number of a port used by the antenna line device to receive the detection signal and a port number of a port used by the antenna line device to send the detection signal.

It should be understood that in a process of sending the detection signal, each antenna line device may add port information of the antenna line device. The port information includes a port number of a port used to receive a detection signal sent by a previous antenna line device connected in series to the antenna line device, and a port number of a port used to send the detection signal to a next antenna line device connected in series to the antenna line device. The two ports used to receive the detection signal and used to send the detection signal may further be indicated to a next antenna line device by changing a port status, for example, the port status is different from a status of another port (a level of the port is changed to a level different from a level of the another port).

Optionally, in an implementation of the first aspect, the port information of the antenna line device further includes a port number of each of a plurality of ports of the antenna line device and a frequency band corresponding to each port.

Optionally, in an implementation of the first aspect, before each of the at least one antenna line device receives the detection signal from the detection device or the previous antenna line device connected in series to the antenna line device, the method further includes: receiving, by the antenna line device, a start signal from the detection device;

and entering, by the antenna line device, a to-be-detected state based on the start signal.

Optionally, in an implementation of the first aspect, the start signal includes a frequency band corresponding to a port used by the detection device to send the start signal, and the method further includes: determining, by the antenna line device, whether the antenna line device supports the frequency band; and if the antenna line device supports the frequency band, sending, by the antenna line device, the start signal to the antenna or the next antenna line device connected in series to the antenna line device.

Optionally, in an implementation of the first aspect, the detection signal includes an Antenna Interface Standards Group AISG detection signal used to detect an AISG channel, and the port information of the antenna line device further includes: a port number of a port of an AISG channel of the antenna line device, and a port number of an output end of the AISG channel of the antenna line device.

Optionally, in an implementation of the first aspect, the detection device includes a radio remote unit RRU or a handheld test device.

Optionally, in an implementation of the first aspect, the antenna line device includes a splitter, a combiner, a tower-mounted amplifier, a coupler, or a transmission unit corresponding to the antenna line device, the transmission unit corresponding to the antenna line device and the antenna line device use a same port, and the transmission unit is configured to transmit the detection signal and the feedback signal.

According to a second aspect, a signal transmission method in a radio frequency network is provided. The radio frequency network includes a detection device, at least one antenna line device, and an antenna that are sequentially connected in series by using a radio frequency channel, the detection device is configured to generate a detection signal, the antenna is configured to generate a feedback signal for the detection signal, the at least one antenna line device is configured to forward the detection signal between the detection device and the antenna, and the method includes:

receiving, by each of the at least one antenna line device, the feedback signal from the antenna or a previous antenna line device connected in series to the antenna line device; and adding, by the antenna line device, device information of the antenna line device to the received feedback signal, and sending, to the detection device or a next antenna line device connected in series to the antenna line device, the feedback signal to which the device information is added.

Therefore, the detection device can obtain device information of each of devices connected in series on a radio frequency line, to determine whether a connection relationship between the devices is correct, and determine, when a connection error occurs, a specific port location at which the error occurs.

Optionally, in an implementation of the second aspect, the device information of the antenna line device includes port information of the antenna line device, or includes port information of the antenna line device and device type information of the antenna line device.

It should be understood that location information of each antenna line device in the at least one antenna line device connected in series may be, for example, a hop number. The hop number is used as an example. In a plurality of levels of devices connected in series, a first-level device has a hop number, and a second-level device has a hop number. Successively, each level of device has a hop number. A hop number of each device indicates a level of the device in the plurality of levels, in other words, a location of the device in the at least one antenna line device connected in series. For example, location information of a first antenna line device herein may be 1, and it indicates that the first antenna line device is a first-level device directly connected to the detection device; location information of a second antenna line device may be 2, and it indicates that the second antenna line device is a second-level device directly connected to the first antenna line device; and location information of the antenna may be 3, and it indicates that the antenna is a third-level device, that is, a last-level device Optionally, in an implementation of the second aspect, the port information of the antenna line device includes a port number of a port used by the antenna line device to receive the detection signal and a port number of a port used by the antenna line device to send the detection signal.

It should be understood that in a process of sending the detection signal, each antenna line device may add port information of the antenna line device. The port information includes a port number of a port used to receive a detection signal sent by a previous antenna line device connected in series to the antenna line device, and a port number of a port used to send the detection signal to a next antenna line device connected in series to the antenna line device. The two ports used to receive the detection signal and used to send the detection signal may further be indicated to a next antenna line device by changing a port status, for example, the port status is different from a status of another port (a level of the port is changed to a level different from a level of the another port).

Optionally, in an implementation of the second aspect, the port information of the antenna line device further includes a port number of each of a plurality of ports of the antenna line device and a frequency band corresponding to each port.

Optionally, in an implementation of the second aspect, before each of the at least one antenna line device receives the feedback signal from the antenna or the previous antenna line device connected in series to the antenna line device, the method further includes: receiving, by the antenna line device, a start signal from the detection device; and entering, by the antenna line device, a to-be-detected state based on the start signal.

Optionally, in an implementation of the second aspect, the start signal includes a frequency band corresponding to a port used by the detection device to send the start signal, and the method further includes: determining, by the antenna line device, whether the antenna line device supports the frequency band; and if the antenna line device supports the frequency band, sending, by the antenna line device, the start signal to the antenna or the next antenna line device connected in series to the antenna line device.

Optionally, in an implementation of the second aspect, detection signal includes an Antenna Interface Standards Group AISG detection signal used to detect an AISG channel, and the port information of the antenna line device further includes: a port number of a port of an AISG channel of the antenna line device, and a port number of an output end of the AISG channel of the antenna line device.

Optionally, in an implementation of the second aspect, the detection device includes a radio remote unit RRU or a handheld test device.

Optionally, in an implementation of the second aspect, the antenna line device includes a splitter, a combiner, a tower-mounted amplifier, a coupler, or a transmission unit corresponding to the antenna line device, the transmission unit corresponding to the antenna line device and the antenna line device use a same port, and the transmission unit is configured to transmit the detection signal and the feedback signal.

According to a third aspect, a signal transmission method in a radio frequency network is provided. The radio frequency network includes a detection device, at least one antenna line device, and an antenna that are sequentially connected in series by using a radio frequency channel, the detection device is configured to generate a detection signal, the at least one antenna line device is configured to generate a feedback signal, and the method includes:

receiving, by each of the at least one antenna line device, a detection signal that is from the detection device and that is corresponding to the antenna line device;

generating, by the antenna line device, the feedback signal based on the detection signal, where the feedback signal includes device information of the antenna line device; and sending, by the antenna line device, the feedback signal to the detection device.

Therefore, the detection device can obtain device information of each of devices connected in series on a radio frequency line, to determine whether a connection relationship between the devices is correct, and determine, when a connection error occurs, a specific port location at which the error occurs.

Optionally, in an implementation of the third aspect, the device information of the antenna line device includes port information of the antenna line device, or includes port information of the antenna line device and at least one of the following information: device type information of the antenna line device and location information of the antenna line device in the at least one antenna line device connected in series It should be understood that location information of each antenna line device in the at least one antenna line device connected in series may be, for example, a hop number. The hop number is used as an example. In a plurality of levels of devices connected in series, a first-level device has a hop number, and a second-level device has a hop number. Successively, each level of device has a hop number. A hop number of each device indicates a level of the device in the plurality of levels, in other words, a location of the device in the at least one antenna line device connected in series. For example, location information of a first antenna line device herein may be 1, and it indicates that the first antenna line device is a first-level device directly connected to the detection device; location information of a second antenna line device may be 2, and it indicates that the second antenna line device is a second-level device directly connected to the first antenna line device; and location information of the antenna may be 3, and it indicates that the antenna is a third-level device, that is, a last-level device.

Optionally, in an implementation of the third aspect, the port information of the antenna line device includes: a port number of a port used by an antenna line device that is connected in series to the antenna line device between the antenna line device and the detection device to receive the detection signal, a port number of a port used to send the detection signal, and a port number of a port used by the antenna line device to receive the detection signal.

Optionally, in an implementation of the third aspect, the port information of the antenna line device further includes a port number of each of a plurality of ports of the antenna line device and a frequency band corresponding to each port.

Optionally, in an implementation of the third aspect, before the antenna line device receives the detection signal sent by the detection device, the method further includes:

receiving, by the antenna line device, a start signal from the detection device; and entering, by the antenna line device, a to-be-detected state based on the start signal.

Optionally, in an implementation of the third aspect, the start signal includes a frequency band corresponding to a port used by the detection device to send the start signal, and the method further includes: determining, by the antenna line device, whether the antenna line device supports the frequency band corresponding to the port used to send the start signal; and if the antenna line device supports the frequency band corresponding to the port used to send the start signal, sending, by the antenna line device, the start signal to the antenna or the next antenna line device connected in series to the antenna line device.

Optionally, in an implementation of the third aspect, the detection signal includes an Antenna Interface Standards Group AISG detection signal used to detect an AISG channel, and the port information of the antenna line device further includes: a port number of a port of an AISG channel of the antenna line device.

Optionally, the detection signal received by the antenna line device from the detection device is a modulation signal; and that the antenna line device sends the feedback signal to the detection device includes: modulating, by the antenna line device, the feedback signal by using a modulation circuit in the antenna line device, and sending the modulated feedback signal to the detection device.

Optionally, in an implementation of the third aspect, the detection device includes a radio remote unit RRU or a handheld test device.

Optionally, in an implementation of the third aspect, the antenna line device includes a splitter, a combiner, a tower-mounted amplifier, a coupler, or a transmission unit corresponding to the antenna line device, the transmission unit corresponding to the antenna line device and the antenna line device use a same port, and the transmission unit is configured to transmit the detection signal and the feedback signal.

It should be understood that the detection signal and the feedback signal may be digital information, an analog signal, or the like. The detection signal may be used to determine a specific port whose information needs to be obtained.

It should be further understood that the detection device may send the detection signal and the feedback signal through independent channel control or by using an existing radio frequency channel, and these signals may be delivered by using a feeder or an AISG cable.

According to a fourth aspect, a signal transmission method in a radio frequency network is provided. The radio frequency network includes a detection device, at least one antenna line device, and an antenna that are sequentially connected in series by using a radio frequency channel, the detection device is configured to generate a detection signal, the antenna is configured to generate a feedback signal for the detection signal, the at least one antenna line device is configured to forward the detection signal between the detection device and the antenna, and the method includes:

generating, by the detection device, a detection signal, and sending the detection signal to a next antenna line device connected in series to the detection device; and receiving, by the detection device, a feedback signal sent by a next antenna line device connected in series to the detection device, where the feedback signal includes device information of the at least one antenna line device and device information of the antenna.

Therefore, the detection device can obtain device information of each of devices connected in series on a radio frequency line, to determine whether a connection relationship between the devices is correct, and determine, when a connection error occurs, a specific port location at which the error occurs.

Optionally, in an implementation of the fourth aspect, device information of each antenna line device includes port information of the antenna line device, or includes port information of the antenna line device and device type information of the antenna line device.

Optionally, in an implementation of the fourth aspect, the port information of the antenna line device includes a port number of a port used by the antenna line device to receive the detection signal and a port number of a port used by the antenna line device to send the detection signal.

Optionally, in an implementation of the fourth aspect, the port information of the antenna line device further includes a port number of each of a plurality of ports of the antenna line device and a frequency band corresponding to each port.

According to a fifth aspect, a signal transmission method in a radio frequency network is provided. The radio frequency network includes a detection device, at least one antenna line device, and an antenna that are sequentially connected in series by using a radio frequency channel, and the method includes:

generating, by the detection device, a detection signal, and sending the detection signal to each of the at least one antenna line device; and receiving, by the detection device, a feedback signal sent by the antenna line device, where the feedback signal includes device information of the antenna line device.

Optionally, in an implementation of the fifth aspect, the device information of the antenna line device includes port information of the antenna line device, or includes port information of the antenna line device and device type information of the antenna line device.

Optionally, in an implementation of the fifth aspect, the port information of the antenna line device includes a port number of a port used by the antenna line device to receive the detection signal and a port number of a port used by the antenna line device to send the detection signal.

Optionally, in an implementation of the fifth aspect, the port information of the antenna line device further includes a port number of each of a plurality of ports of the antenna line device and a frequency band corresponding to each port.

According to a sixth aspect, an antenna line device is provided, and the antenna line device may perform the method in the foregoing first aspect and various implementations. The antenna line device is located in a radio frequency network. The radio frequency network includes a detection device, at least one antenna line device, and an antenna that are sequentially connected in series by using a radio frequency channel. The at least one antenna line device includes the antenna line device, and the antenna line device includes a receiving module and a sending module. The receiving module is configured to receive a detection signal from the detection device or a previous antenna line device connected in series to the antenna line device. The sending module is configured to: add device information of the antenna line device to the received detection signal, and send, to the antenna or a next antenna line device connected in series to the antenna line device, the detection signal to which the device information is added.

According to a seventh aspect, an antenna line device is provided, and the antenna line device may perform the method in the foregoing second aspect and various implementations. The antenna line device is located in a radio frequency network. The radio frequency network includes a detection device, at least one antenna line device, and an antenna that are sequentially connected in series by using a radio frequency channel. The detection device is configured to generate a detection signal, the antenna is configured to generate a feedback signal for the detection signal, the at least one antenna line device is configured to forward the detection signal between the detection device and the antenna, the at least one antenna line device includes the antenna line device, and the antenna line device includes a receiving module and a sending module. The receiving module is configured to receive the feedback signal from the antenna or a previous antenna line device connected in series to the antenna line device. The sending module is configured to: add device information of the antenna line device to the received feedback signal, and send, to the detection device or a next antenna line device connected in series to the antenna line device, the feedback signal to which the device information is added.

According to an eighth aspect, an antenna line device is provided, and the antenna line device may perform the method in the foregoing third aspect and various implementations. The antenna line device is located in a radio frequency network. The radio frequency network includes a detection device, at least one antenna line device, and an antenna that are sequentially connected in series by using a radio frequency channel. The detection device is configured to generate a detection signal, the antenna is configured to generate a feedback signal for the detection signal, the at least one antenna line device includes the antenna line device, and the antenna line device includes a receiving module, a processing module, and a sending module. The receiving module is configured to receive the detection signal from the detection device. The processing module is configured to generate the feedback signal based on the detection signal, where the feedback signal includes device information of the antenna line device. The sending module is configured to send the feedback signal to the detection device.

According to a ninth aspect, a radio frequency system is provided. The radio frequency system may include a detection device, at least one antenna line device, and an antenna that are sequentially connected in series by using a radio frequency channel in the foregoing first aspect and various implementations. Each of the at least one antenna line device may be configured to: receive a detection signal from the detection device or a previous antenna line device connected in series to the antenna line device; and add device information of the antenna line device to the received detection signal, and send, to the antenna or a next antenna line device connected in series to the antenna line device, the detection signal to which the device information is added.

According to a tenth aspect, a radio frequency system is provided. The radio frequency system may include a detection device, at least one antenna line device, and an antenna that are sequentially connected in series by using a radio frequency channel in the foregoing second aspect and various implementations. The detection device is configured to generate a detection signal, the antenna is configured to generate a feedback signal for the detection signal, the at least one antenna line device is configured to forward the detection signal between the detection device and the antenna, and each of the at least one antenna line device is configured to: receive the feedback signal from the antenna or a previous antenna line device connected in series to the antenna line device; and add device information of the antenna line device to the received feedback signal, and send, to the detection device or a next antenna line device connected in series to the antenna line device, the feedback signal to which the device information is added.

According to an eleventh aspect, a radio frequency system is provided. The radio frequency system may include a detection device, at least one antenna line device, and an antenna that are sequentially connected in series by using a radio frequency channel and that are included in the radio frequency network in the foregoing third aspect and various implementations. The detection device is configured to generate a detection signal, the at least one antenna line device is configured to generate a feedback signal, and each of the at least one antenna line device is configured to: receive the detection signal from the detection device; generate the feedback signal based on the detection signal, where the feedback signal includes device information of the antenna line device; and send the feedback signal to the detection device.

Optionally, the device information of the antenna line device includes port information of the antenna line device, or includes port information of the antenna line device and at least one of the following information: device type information of the antenna line device and location information of the antenna line device in the at least one antenna line device connected in series.

Optionally, the port information of the antenna line device includes a port number of a port used by the antenna line device to receive the detection signal, and a port number of a port used by the antenna line device to send the detection signal.

Optionally, the port information of the antenna line device may further include a port number of each of a plurality of ports of the antenna line device and a frequency band corresponding to each port.

Based on the solutions provided in the present application, the detection device can obtain device information of each of devices connected in series on a radio frequency line, to determine a port connection relationship between the devices.

BRIEF DESCRIPTION OF DRAWINGS

To describe the technical solutions in the embodiments of the present application more clearly, the following briefly describes the accompanying drawings required for describing the embodiments or the prior art. Apparently, the accompanying drawings in the following description show merely some embodiments of the present application, and a person of ordinary skill in the art may derive other drawings from these accompanying drawings without creative efforts.

DESCRIPTION OF EMBODIMENTS

The following clearly describes the technical solutions in the embodiments of the present application with reference to the accompanying drawings in the embodiments of the present application. Apparently, the described embodiments are some but not all of the embodiments of the present application. All other embodiments obtained by a person of ordinary skill in the art based on the embodiments of the present application without creative efforts shall fall within the protection scope of the present application.

Figure 1:
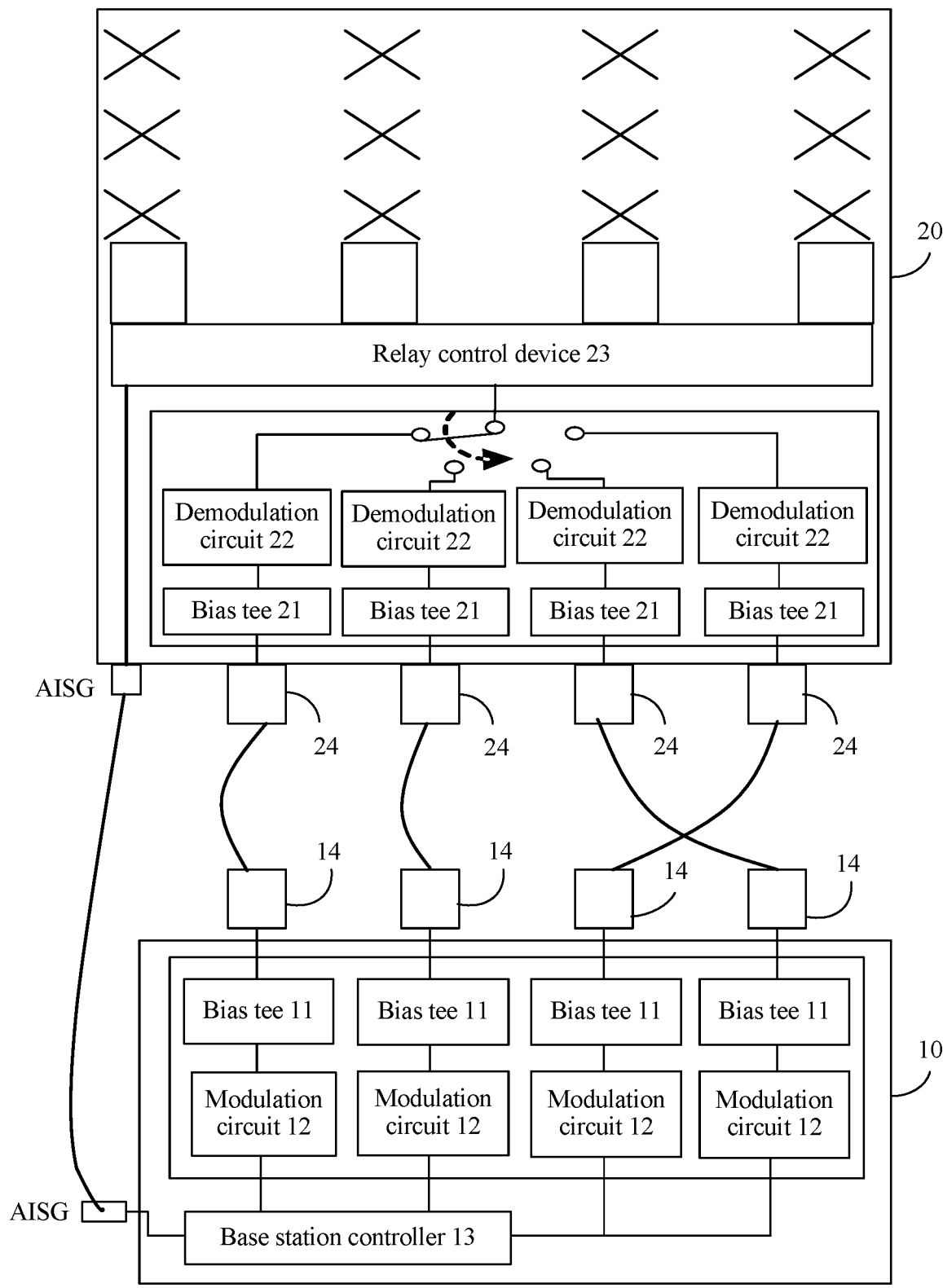
FIG. 1 is a schematic diagram of a system architecture according to an embodiment of the present application.

FIG. 1 is a schematic diagram of a system architecture according to an embodiment of the present application. FIG. 1 shows a base station 10 and an antenna 20. The base station 10 includes a bias tee 11, a modulation circuit 12, a base station controller 13, and a radio frequency port 14. A quantity of bias tees 11 and a quantity of modulation circuits 12 each are the same as a quantity of radio frequency ports 14 of the base station 10. The antenna 20 includes a bias tee 21, a modulation circuit 22, a remote control unit (RCU) 23, and a radio frequency port 24. A quantity of bias tees 21 and a quantity of modulation circuits 22 each are the same as a quantity of radio frequency ports 24 of the antenna 20.

In the base station 10, an input end of the modulation circuit 12 is connected to a direct current power supply, an output end is connected to a direct current input end of the bias tee 11, and a control end is connected to an output end of the base station controller 13. The modulation circuit is configured to generate a modulated detection signal. A radio frequency signal is input to an alternating current input end of the bias tee 11, and an output end is connected to the radio frequency port of the base station. The bias tee is configured to: couple the detection signal to the radio frequency signal, to obtain a coupled signal; transmit the coupled signal to a corresponding antenna through the radio frequency port of the base station 10, so that the antenna demodulates the coupled signal; and upload feedback information to the base station through an Antenna Interface Standards Group (AISG) input port, where the feedback information includes identification information of a radio frequency port that is of the antenna and that receives the coupled signal. The base station controller 13 is configured to: control the modulation circuit to generate the detection signal, receive the feedback information, and establish a correspondence between a sector of the base station and the antenna based on the feedback information.

Figure 2:
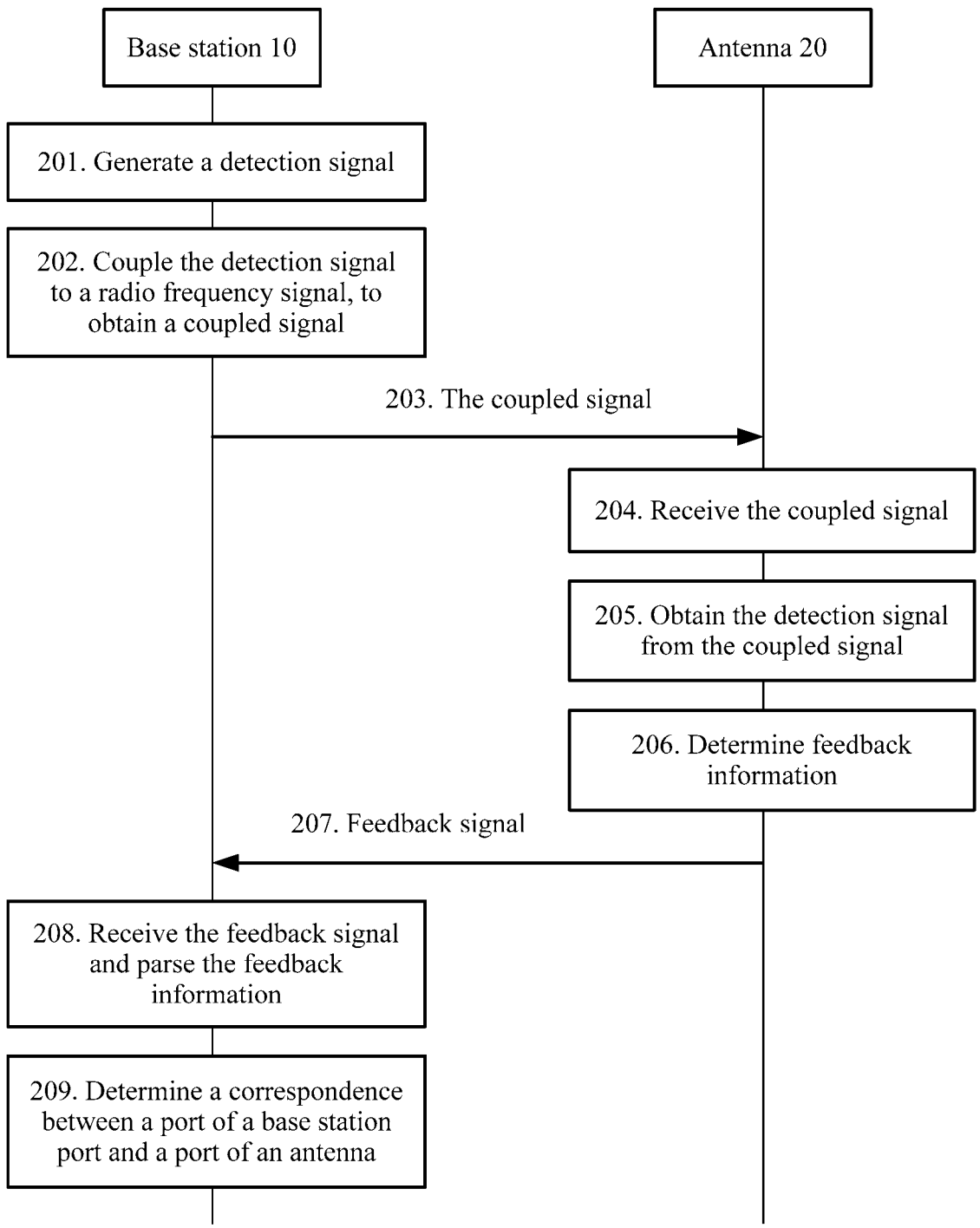
FIG. 2 is an interactive flowchart of a method for determining a port correspondence between a base station and an antenna in the prior art.

For how the base station 10 determines a correspondence between a port of the base station 10 and a port of the antenna 20, refer to a method shown in FIG. 2.

FIG. 2 is an interactive flowchart of a method for determining a correspondence between a base station and an antenna in the prior art. As shown in FIG. 2, the process is as follows.

201. A base station 10 generates a detection signal.

202. The base station 10 couples the detection signal to a radio frequency signal, to obtain a coupled signal.

203. The base station 10 sends the coupled signal to an antenna 20.

Specifically, the base station 10 transmits the coupled signal to the antenna 20 through a radio frequency port 14 of the base station 10.

204. The antenna 20 receives the coupled signal sent by the base station 10.

Specifically, the antenna 20 receives the coupled signal through a radio frequency port 24 of the antenna 20.

205. The antenna 20 separates the coupled signal, and obtains the detection signal from the coupled signal.

206. The antenna 20 determines feedback information.

Specifically, the antenna 20 generates the feedback information based on the detection signal and identification information corresponding to the radio frequency port 24 that is of the antenna 20 and that receives the coupled signal.

207. The antenna 20 sends the feedback information to the base station 10.

208. The base station 10 receives the feedback information, and parses the feedback information.

Specifically, the base station 10 parses the feedback information, to obtain the identification information corresponding to the radio frequency port 24 of the antenna 20.

209. The base station 10 determines a correspondence between a port 14 of the base station 10 and a port 24 of the antenna 20.

Specifically, after receiving the feedback information, the base station 10 may establish, based on the identification information of the radio frequency port 24 of the antenna 20, the correspondence between the radio frequency port 24 and the radio frequency port 14 of the base station 10 that sends the coupled signal, to obtain a correspondence between a sector of the base station and an antenna.

However, in this way, only a correspondence between a port of a detection device (such as a base station) and a port of an antenna can be determined, and a connection relationship between other antenna line devices on an entire line between the detection device and the antenna cannot be determined. Therefore, ports of these antenna line devices cannot be detected. When a fault, for example, a connection error, occurs on a line between a primary device and the antenna, a specific location at which the fault occurs cannot be determined. Consequently, a problem caused to a topology connection in a radio frequency network cannot be specifically positioned, and a live problem cannot be quickly determined.

According to the method in the embodiments of the present application, during detection of a radio frequency network, a device connection relationship in the radio frequency network can be obtained, so that when a connection error occurs on a network connection, a specific location at which the connection error occurs can be detected.

In the embodiments of the present application, an antenna line device may include all devices connected between a detection device and an antenna, for example, a tower-mounted amplifier (TMA), a combiner, a splitter, and a coupler.

Figure 3:
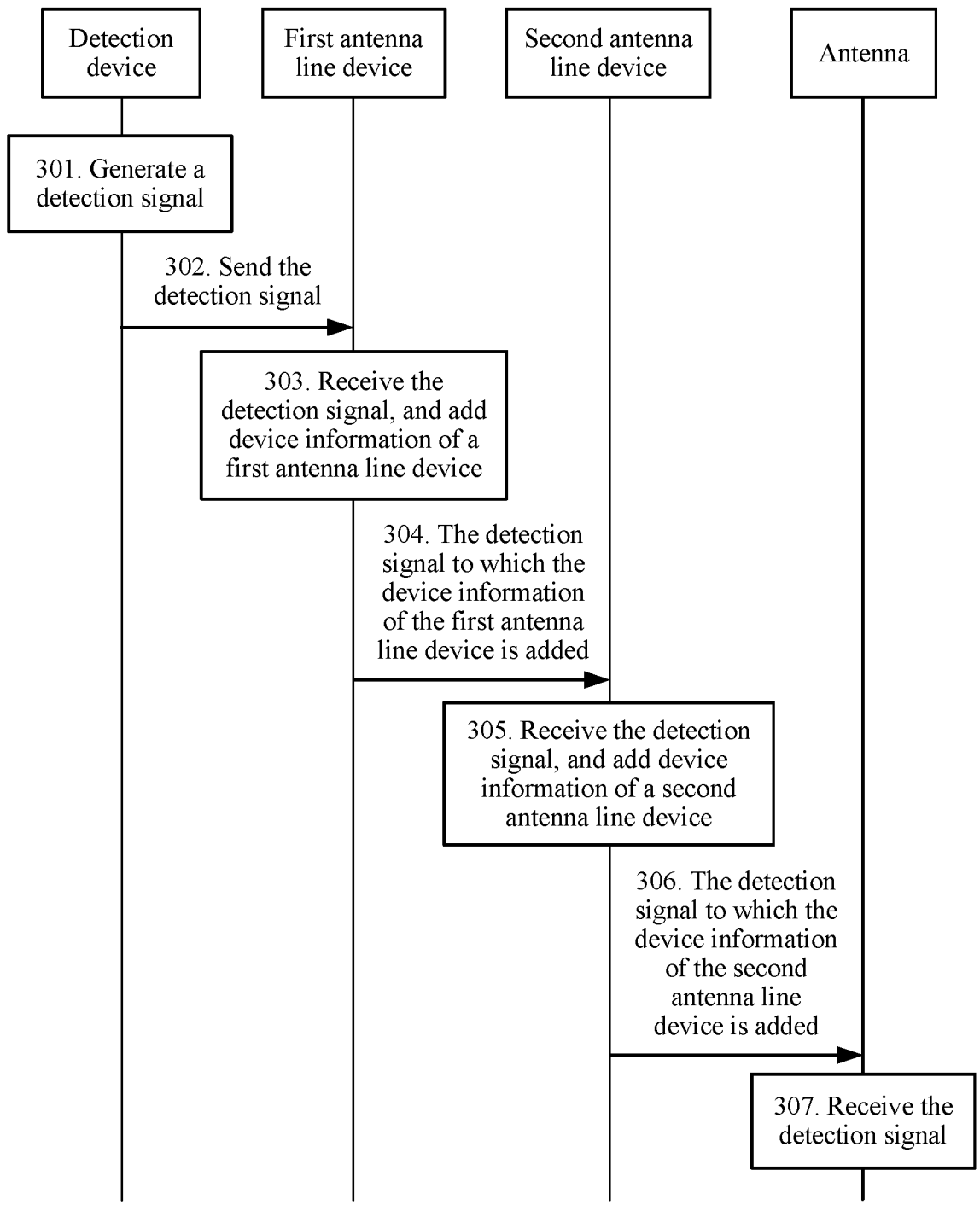
FIG. 3 is an interactive flowchart of a signal transmission method in a radio frequency network according to an embodiment of the present application.

FIG. 3 is an interactive flowchart of a signal transmission method in a radio frequency network according to an embodiment of the present application. The radio frequency network in this embodiment of the present application may include a detection device, at least one antenna line device, and an antenna. The detection device, the at least one antenna line device, and the antenna are sequentially connected in series by using a radio frequency channel.

The detection device may be configured to generate a detection signal. The antenna may be configured to generate a feedback signal corresponding to the detection signal. The at least one antenna line device may be configured to forward the detection signal and the feedback signal between the detection device and the antenna.

The detection device may be, for example, a radio remote unit RRU or a handheld test device. The at least one antenna line device may include, for example, a splitter, a combiner, a coupler, or a tower-mounted amplifier. Types of the detection device and the antenna line device are not limited in this embodiment of the present application.

It should be understood that, in this embodiment of the present application, the antenna line device may further include a splitter, a combiner, a coupler, a tower-mounted amplifier, or the like, or include a transmission unit corresponding to the antenna line device. The transmission unit and the antenna line device use a same port, and the transmission unit is configured to transmit the detection signal and the feedback signal.

To be specific, the detection signal and the feedback signal in this embodiment of the present application may be transmitted through an existing radio frequency channel, or may be transmitted by using the transmission unit. The transmission unit may be, for example, a transmission channel that matches the antenna line device and that is configured to transmit a modulation signal such as the detection signal and the feedback signal, and the transmission unit reuses a port on an original antenna line device. For example, the detection signal may be transmitted from an input port of the antenna line device to the antenna line device, or may be transmitted to the transmission unit through an input port of the antenna line device, and output from an output port of the antenna line device by using the transmission unit.

FIG. 3 is described by using an example in which two antenna line devices are included: a first antenna line device and a second antenna line device. However, the present application is not limited thereto. More antenna line devices may be included, or only one antenna line device may be included. The detection device, the first antenna line device, the second antenna line device, and the antenna are sequentially connected in series by using the radio frequency channel. In this embodiment, each of the at least one antenna line device receives the detection signal from the detection device or a previous antenna line device connected in series to the antenna line device. Each antenna line device adds device type information and port information of the antenna line device to the received detection signal, and sends, to the antenna or a next antenna line device connected in series to the antenna line device, the detection signal to which the device type information and the port information are added.

As shown in FIG. 3, the detection method in the radio frequency network includes the following steps.

301. The detection device generates a detection signal.

Specifically, the detection device may initiate detection on any line in the radio frequency network, and lines may be corresponding to different ports on the detection device. The detection device sends, for a to-be-detected line through a port, the detection signal to the antenna line device on the port. For example, the detection signal may include a frequency band corresponding to a port used by the detection device to send the detection signal.

302. The detection device sends the detection signal to the first antenna line device.

For example, the detection signal includes a port number a1 of the port used by the detection device to send the detection signal and a corresponding frequency band Fa.

303. The first antenna line device receives the detection signal from the detection device, and adds device information of the first antenna line device to the received detection signal.

Optionally, the device information of the first antenna line device may include port information of the first antenna line device, or include port information of the first antenna line device and device type information of the first antenna line device.

For example, after receiving the detection signal, the first antenna line device adds the port information of the first antenna line device to the detection signal.

Optionally, the port information that is added by the first antenna line device to the detection signal may include: a port number of a port used by the first antenna line device to receive the detection signal, and a port number of a port used by the first antenna line device to send the detection signal to which the type information and the port information of the first antenna line device are added.

For example, the first antenna line device adds, to the detection signal, a port number a2 of the port used to receive the detection signal and a port number c1 of a port used by the first antenna line device to send the detection signal to the second antenna line device, and adds a device type "device A" of the first antenna line device to the detection signal.

304. The first antenna line device sends, to the second antenna line device, the detection signal to which the device information of the first antenna line device is added.

For example, the first antenna line device sends, to a next antenna line device connected in series to the first antenna line device, namely, the second antenna line device, the detection signal to which the port number a2, the port number c1, and the "device A" are added.

305. The second antenna line device receives the detection signal sent by the first antenna line device, and adds device information of the second antenna line device to the received detection signal.

For example, the second antenna line device adds, to the detection signal received from the first antenna line device, a port number c2 of a port used to receive the detection signal, a port number a3 of a port used by the second antenna line device to send the detection signal to the antenna, and a device type "device B" of the second antenna line device.

306. The second antenna line device sends, to the antenna, the detection signal to which the device information of the second antenna line device is added.

Optionally, the device information of the second antenna line device may include port information of the second antenna line device, or include port information of the second antenna line device and device type information of the second antenna line device.

307. The antenna receives the detection signal sent by the second antenna line device, and adds device information of the antenna to the received detection signal.

Because each antenna line device adds device information, for example, port information of the antenna line device to the received detection signal, and sends, to the antenna or a next antenna line device connected in series to the antenna line device, the detection signal to which the device information is added, the detection signal finally received by the antenna includes device information of the detection device and device information of all antenna line devices connected in series.

In this case, the antenna adds the device information of the antenna to the detection signal sent by the second antenna line device. For example, the antenna adds, to the detection signal received from the second antenna line device, a port number c4 of a port used to receive the detection signal and a device type "device C" of the antenna. The antenna is a last-level device, and does not need to forward the detection signal.

Then, the antenna line device or the antenna generates a feedback signal for the detection signal, and returns the feedback signal for the detection signal to a network device.

Optionally, device information of each antenna line device may include port information of the antenna line device, or include port information of the antenna line device and device type information of the antenna line device.

Optionally, the port information of each antenna line device includes: a port number of a port used by the antenna line device to receive the detection signal, and a port number of a port used by the antenna line device to send the detection signal.

Optionally, the port information of each antenna line device may further include a port number of each of a plurality of ports of the antenna line device and a frequency band corresponding to each port.

In this way, the detection device may finally obtain detailed port information of each device, and may perform overall control based on the port information, to help with subsequent maintenance.

In another embodiment, each antenna line device receives the feedback signal from the antenna. The feedback signal includes device type information and port information of the at least one antenna line device, and the device type information and the port information of the antenna. Each antenna line device sends the feedback signal to the detection device.

Figure 4:
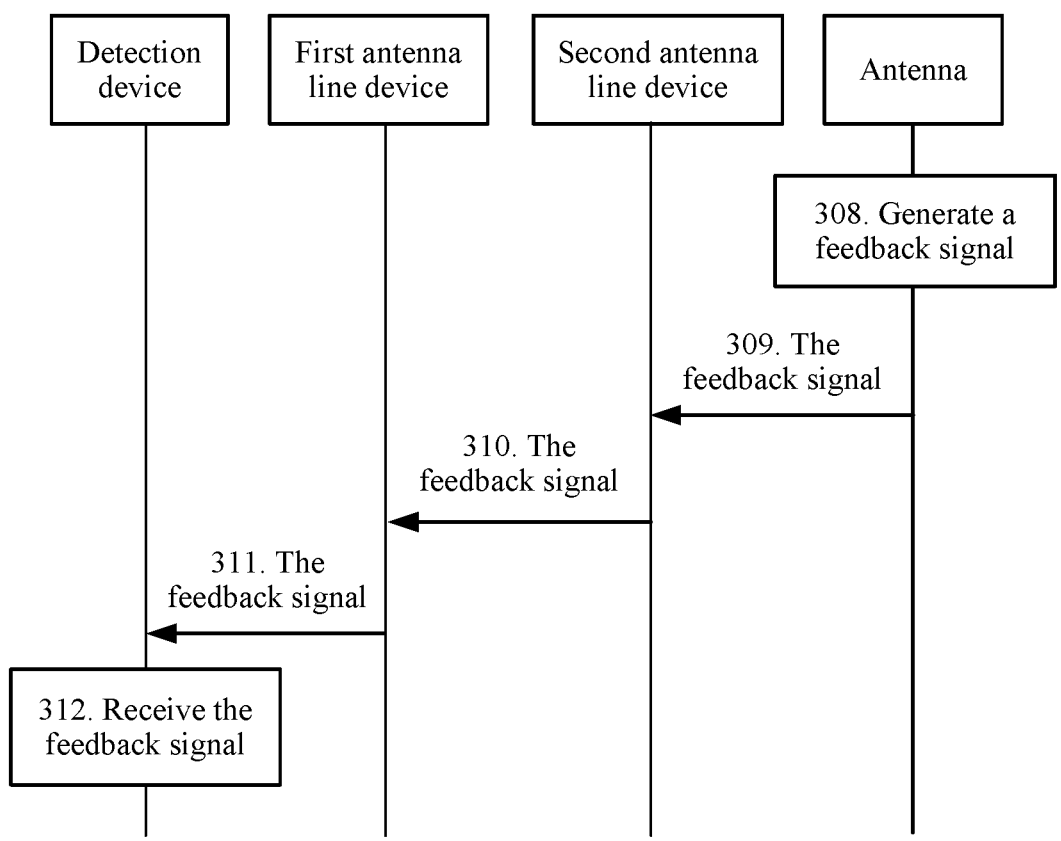
FIG. 4 is an interactive flowchart of a signal transmission method in a radio frequency network according to another embodiment of the present application.

For example, FIG. 4 is an interactive flowchart of a signal transmission method in a radio frequency network according to an embodiment of the present application. The method further includes steps 308 to 312.

308. The antenna generates a feedback signal.

The feedback signal includes the device information of the at least one antenna line device and the device information of the antenna.

For example, the feedback signal includes: the port number a1 of the port used by the detection device to send the detection signal and the corresponding frequency band Fa; the port number a2 of the port used by the first antenna line device to receive the detection signal, the port number c1 of the port used by the first antenna line device to send the detection signal to the second antenna line device, and the device type "device A" of the first antenna line device; the port number c2 of the port used by the second antenna line device to receive the detection signal, the port number a3 of the port used by the second antenna line device to send the detection signal to the antenna, and the device type "device B" of the second antenna line device; and the port number c4 of the port used by the antenna to receive the detection signal and the device type "device C" of the antenna.

309. The antenna sends the feedback signal to the second antenna line device.

310. The second antenna line device receives the feedback signal, and sends the feedback signal to the first antenna line device.

311. The first antenna line device receives the feedback signal, and sends the feedback signal to the detection device.

312. The detection device receives the feedback signal.

In this way, the detection device can obtain the device information of the at least one antenna line device on this serial connection line and the device information of the antenna, and can determine, based on the device information, for example, the port information, whether a connection between each device and another device is correct, and help with subsequent maintenance.

It should be understood that the detection signal and the feedback signal in this embodiment of the present application may be digital information, an analog signal, or the like. The detection signal may be used to determine a specific port whose information needs to be obtained.

It should be further understood that the detection device may send the detection signal and the feedback signal through independent channel control or by using an existing radio frequency sending feeder coupling channel, and these signals may be delivered by using a feeder or an AISG cable.

It should be further understood that in a process of sending the detection signal, each antenna line device may add port information of the antenna line device. The port information includes a port number of a port used to receive a detection signal sent by a previous antenna line device connected in series to the antenna line device, and a port number of a port used to send the detection signal to a next antenna line device connected in series to the antenna line device. The two ports used to receive the detection signal and used to send the detection signal may further be indicated to a next antenna line device by changing a port status, for example, the port status is different from a status of another port (a level of the port is changed to a level different from a level of the another port).

In the foregoing descriptions, the detection device may obtain port information and device type information of all antenna line devices and the antenna at a time. The detection device also detects the port information and the device type information of the antenna line devices and the antenna in a level-by-level manner. How the detection device obtains port information and device type information of the devices in a level-by-level manner is described specifically below.

Figure 5A:
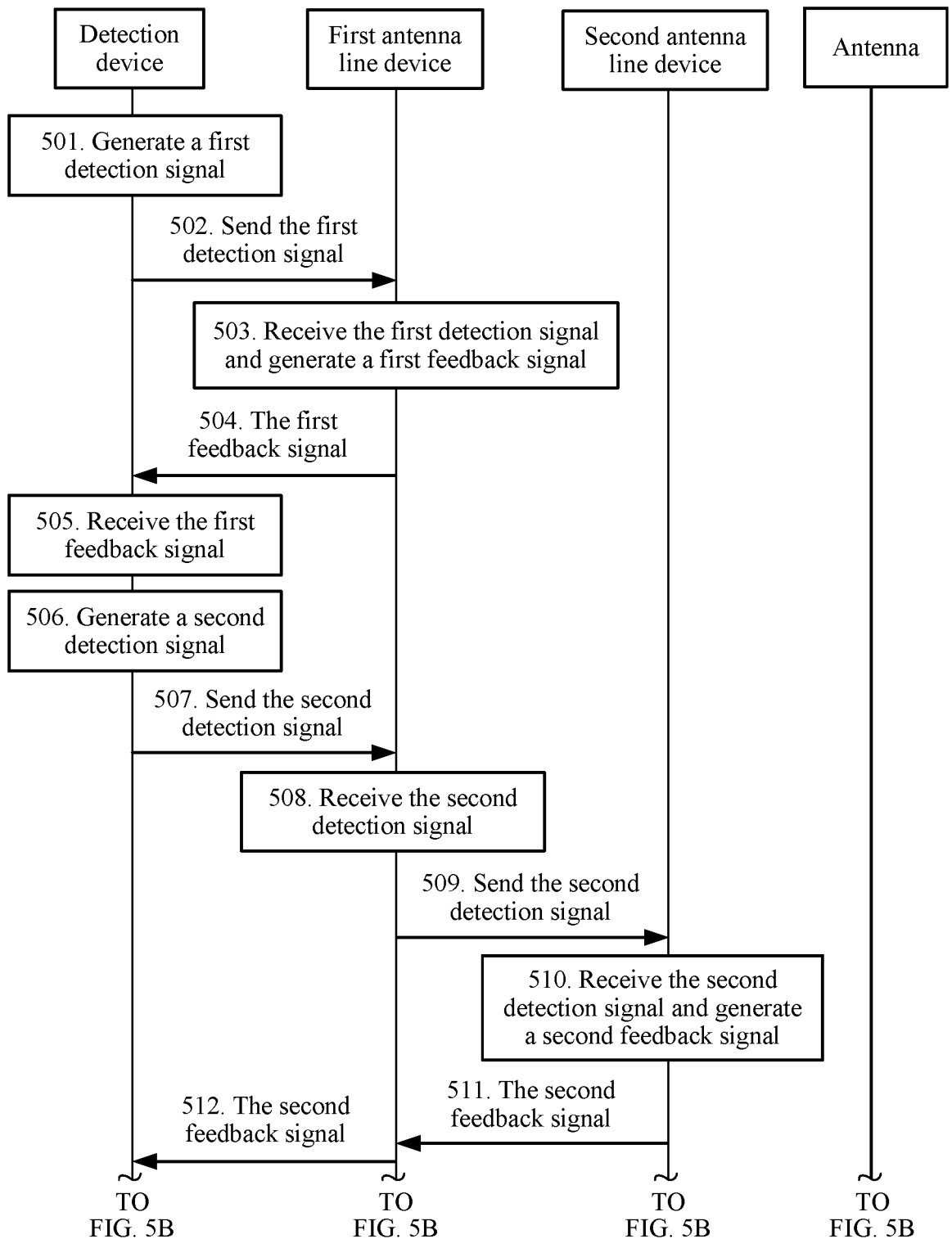
FIG. 5A and FIG. 5B are an interactive flowchart of a signal transmission method in a radio frequency network according to another embodiment of the present application.
Figure 5B:
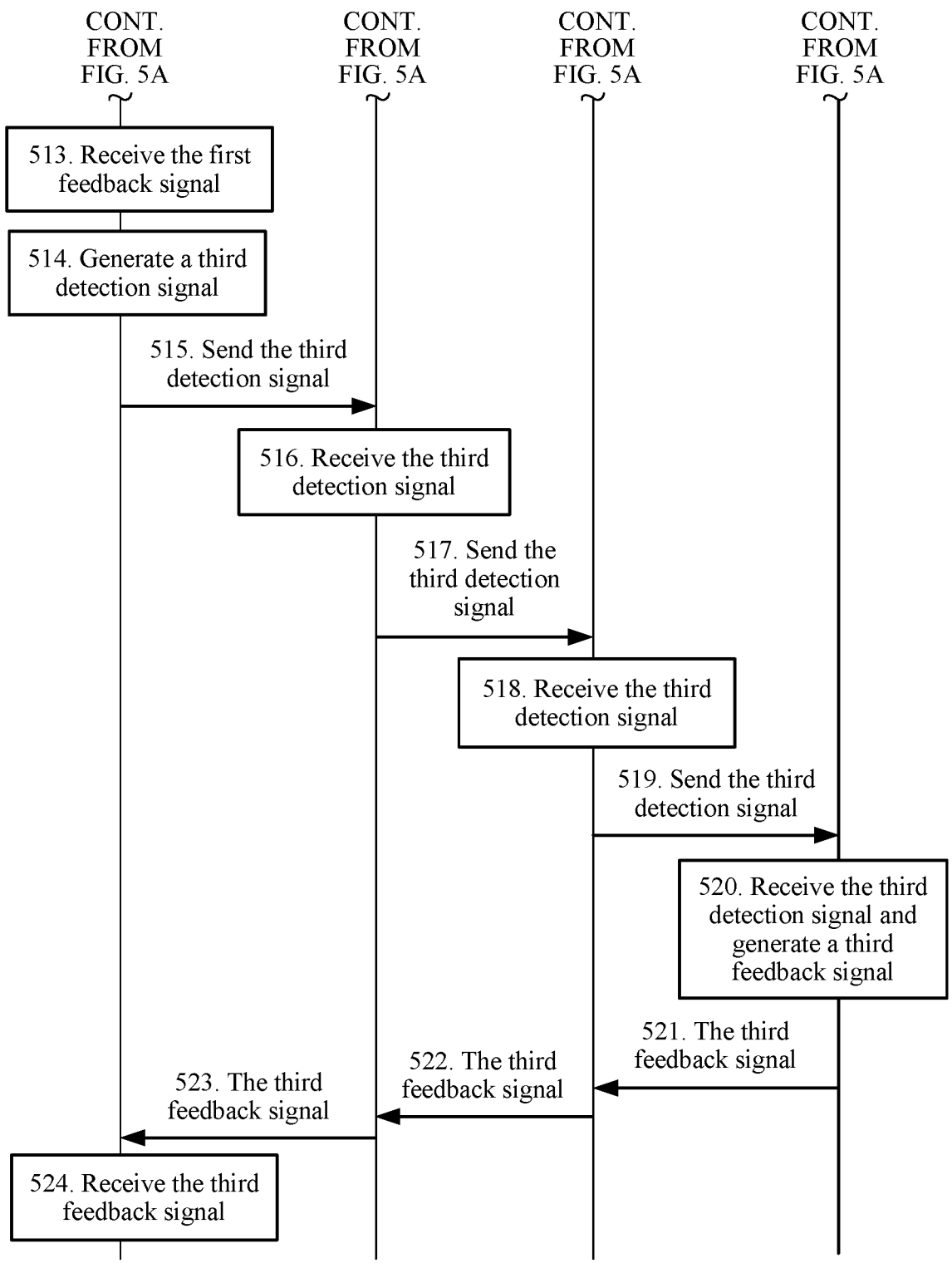

FIG. 5A and FIG. 5B are an interactive flowchart of a signal transmission method in a radio frequency network according to an embodiment of the present application. The radio frequency network in this embodiment of the present application may include a detection device, at least one antenna line device, and an antenna. The detection device, the at least one antenna line device, and the antenna are sequentially connected in series by using a radio frequency channel. The detection device may be configured to generate a detection signal, and the antenna may be configured to generate a feedback signal corresponding to the detection signal.

FIG. 5A and FIG. 5B are described by using an example in which two antenna line devices are included: a first antenna line device and a second antenna line device. However, the present application is not limited thereto. More antenna line devices may be included, or only one antenna line device may be included. The detection device, the first antenna line device, the second antenna line device, and the antenna are sequentially connected in series by using the radio frequency channel. In this embodiment, each of the at least one antenna line device receives a detection signal that is from the detection device and that is corresponding to the antenna line device. Each antenna line device generates a feedback signal based on the detection signal, and the feedback signal includes device information of the antenna line device. Each antenna line device sends the feedback signal to the detection device.

Based on this solution, the detection device can obtain device information, for example, port information of devices connected in series on a radio frequency line, to determine whether a connection relationship between the devices is correct, and determine, when a connection error occurs, a specific port location at which the error occurs.

As shown in FIG. 5A and FIG. 5B, the signal transmission method in the radio frequency network may specifically include the following steps.

501. The detection device generates a first detection signal, where the first detection signal includes a frequency band corresponding to a port used by the detection device to send the first detection signal.

Specifically, the detection device may initiate detection on any line in the radio frequency network, and lines may be corresponding to different ports on the detection device. The detection device sends, for a to-be-detected line through a port, the first detection signal to an antenna line device on the port.

502. The detection device sends the first detection signal to the first antenna line device.

The first detection signal is a detection signal used to detect a first-level device, to be specific, a detection signal corresponding to the first antenna line device.

For example, the first detection signal includes a port number a1 of the port used by the detection device to send the first detection signal and a corresponding frequency band Fa.

503. The first antenna line device receives the first detection signal from the detection device, and generates a first feedback signal.

The first feedback signal includes device information of the first antenna line device.

Optionally, the device information of the first antenna line device may include port information of the first antenna line device, or include port information of the first antenna line device and at least one of the following information: device type information of the first antenna line device and location information of the first antenna line device in the at least one antenna line device connected in series.

Optionally, the port information of the first antenna line device may include a port number of a port used by the first antenna line device to receive the detection signal and a port number of a port used by the detection device to send the first detection signal.

For example, the first feedback signal may include a port number a2 of the port used by the first antenna line device to receive the first detection signal, a device type "device A" of the first antenna line device, and a port number a1 of the port used by the detection device to send the first detection signal.

504. The first antenna line device sends the first feedback signal to the detection device.

505. The detection device receives the first feedback signal sent by the first antenna line device.

506. The detection device generates a second detection signal.

The second detection signal is a detection signal used to detect a second-level device, to be specific, a detection signal corresponding to the second antenna line device.

For example, the second detection signal includes the port number a1 of the port used by the detection device to send the second detection signal and the corresponding frequency band Fa.

507. The detection device sends the second detection signal to the first antenna line device.

508. After receiving the second detection signal, the first antenna line device adds port information of the first antenna line device to the second detection signal.

For example, the first antenna line device adds, to the second detection signal, the port number a2 of the port used to receive the detection signal. The first antenna line device determines a forwarding port c1 based on frequency band information Fa in the detection signal and the frequency band Fa corresponding to the port a of the first antenna line device, and sends, through the port c1 to the second antenna line device, the second detection signal to which the port information of the first antenna line device is added.

509. The first antenna line device sends, to the second antenna line device, the second detection signal to which the port information of the first antenna line device is added.

510. The second antenna line device receives the second detection signal sent by the first antenna line device, and generates a second feedback signal.

The second feedback signal includes device information of the second antenna line device.

Optionally, the device information of the second antenna line device may include port information of the second antenna line device, or include port information of the second antenna line device and at least one of the following information: device type information of the second antenna line device and location information of the second antenna line device in the at least one antenna line device connected in series.

Optionally, the port information of the second antenna line device may include: a port number of a port used by the second antenna line device to receive the detection signal, a port number of a port used by the detection device to send the detection signal, a port number of a port used by the first antenna line device to receive the first detection signal, and a port number of a port used to send the second detection signal.

For example, the second feedback signal includes: a port number c2 of the port used by the second antenna line device to receive the second detection signal, a device type "device B" of the second antenna line device, the port number a2 of the port used by the first antenna line device to receive the first detection signal, the port number c1 of the port used to send the second detection signal, and the port number a1 of the port used by the detection device to send the first detection signal.

511. The second antenna line device sends the second feedback signal to the first antenna line device.

512. The first antenna line device receives the second feedback signal sent by the second antenna line device, and sends the second feedback signal to the detection device.

513. The detection device receives the second feedback signal.

514. The detection device generates a third detection signal.

The third detection signal is a detection signal used to detect a third-level device (the antenna herein), to be specific, a detection signal corresponding to the antenna.

For example, the third detection signal includes the port number a1 of the port used by the detection device to send the third detection signal and the corresponding frequency band Fa.

515. The detection device sends the third detection signal to the first antenna line device.

516. After receiving the third detection signal, the first antenna line device adds the port information of the first antenna line device to the third detection signal.

For example, the first antenna line device adds, to the third detection signal, the port number a2 of the port used to receive the detection signal. The first antenna line device determines the forwarding port c1 based on the frequency band information Fa in the detection signal and the frequency band Fa corresponding to the port a of the first antenna line device, and sends, through the port c1 to the second antenna line device, the third detection signal to which the port information of the first antenna line device is added.

517. The first antenna line device sends, to the second antenna line device, the third detection signal to which the port information of the first antenna line device is added.

518. The second antenna line device receives the third detection signal sent by the first antenna line device, and adds port information of the second antenna line device to the third detection signal.

For example, the second antenna line device continues to add, to the third detection signal, the port number c2 of the port used by the second antenna line device to receive the detection signal. The second antenna line device determines a forwarding port a3 based on the frequency band information Fa in the detection signal and a frequency band Fa corresponding to the port c2 of the second antenna line device, and sends, through the port a3 to the antenna, the third detection signal to which the port information of the second antenna line device is added.

519. The second antenna line device sends, to the antenna, the third detection signal to which the port information of the second antenna line device is added.

520. The antenna sends the third detection signal to which the port information of the second antenna line device is added.

521. The antenna receives the third detection signal sent by the second antenna line device, and generates a third feedback signal.

The third feedback signal includes device information of the antenna.

For example, the third feedback signal may include: a port number a4 of a port used by a third antenna line device to receive the third detection signal, a device type "device C" of the antenna, the port number c2 of the port used by the second antenna line device to receive the second detection signal, the port number a3 of the port used by the second antenna line device to send the third detection signal, the port number a2 of the port used by the first antenna line device to receive the first detection signal, the port number c1 of the port used by the first antenna line device to send the second detection signal, and the port number a1 of the port used by the detection device to send the first detection signal.

522. The second antenna line device sends the third feedback signal to the first antenna line device.

523. The first antenna line device receives the third feedback signal sent by the second antenna line device, and sends the third feedback signal to the detection device.

524. The detection device receives the third feedback signal.

In other words, each antenna line device adds, after receiving a detection signal sent by a previous device connected in series to the antenna line device, port information of the antenna line device to the detection signal, generates a feedback signal, and returns the feedback signal to the detection device by using an original path. After receiving the detection signal, each of devices connected in series and the antenna on the line generate the feedback signal, and return the feedback signal to the detection device. Port information of each device and the antenna is added to the feedback signal. In other words, the first feedback signal, the second feedback signal, and the third feedback signal that are received by the detection device in 505, 513, and 524 include port information of all levels of devices connected in series.

Optionally, the device information of each antenna line device included in feedback information of the antenna line device may include port information of the antenna line device, or include port information of the antenna line device and at least one of the following information: device type information of the antenna line device and location information of the antenna line device in the at least one antenna line device connected in series.

Optionally, the port information of each antenna line device may include a port number of a port used by an antenna line device that is connected in series to the antenna line device between the antenna line device and the detection device to receive the detection signal, a port number of a port used to send the detection signal, and a port number of a port used by the antenna line device to receive the detection signal.

Optionally, the port information of each antenna line device may further include a port number of each of a plurality of ports of the antenna line device and a frequency band corresponding to each port.

It should be understood that location information of each antenna line device in the at least one antenna line device connected in series may be, for example, a hop number. The hop number is used as an example. In a plurality of levels of devices connected in series, a first-level device has a hop number, and a second-level device has a hop number. Successively, each level of device has a hop number. A hop number of each device indicates a level of the device in the plurality of levels, in other words, a location of the device in the at least one antenna line device connected in series. For example, location information of the first antenna line device herein may be 1, and it indicates that the first antenna line device is a first-level device directly connected to the detection device; location information of the second antenna line device may be 2, and it indicates that the second antenna line device is a second-level device directly connected to the first antenna line device; and location information of the antenna may be 3, and it indicates that the antenna is a third-level device, that is, a last-level device.

In this way, the antenna line device may add, to the detection signal or the feedback signal, location information of the antenna line device in the at least one antenna line device connected in series, so that the detection device can obtain a location of the antenna line device on an entire link.

Optionally, the detection signal received by each antenna line device from the detection device is a modulation signal. Each antenna line device sends the feedback signal to the detection device, including: modulating, by the antenna line device, the feedback signal by using a modulation circuit in the antenna line device, and sending the modulated feedback signal to the detection device.

For example, the detection device and the first antenna line device are used as an example. The detection device generates a detection signal, and the detection signal is a modulation signal generated by a modulation/demodulation circuit in the detection device. The detection device couples the modulation signal to a radio frequency signal, to obtain a coupled signal, and transmits the coupled signal to the first antenna line device through a radio frequency port of the detection device. After the first antenna line device receives the coupled signal through a radio frequency port, a modulation/demodulation circuit in the first antenna line device demodulates the coupled signal, and obtains the detection signal from the coupled signal through separation. The first antenna line device generates a feedback signal based on the detection signal. The modulation/demodulation circuit in the first antenna line device modulates the feedback signal, to generate a modulation signal, and returns the modulation signal to the detection device.

Because the detection device and the first antenna line device can modulate and demodulate the detection signal and the feedback signal, and can couple the detection signal and the feedback signal to a feeder on an original radio frequency channel, so that the detection signal and the feedback signal can be transmitted on the radio frequency channel. Therefore, the detection device can receive the feedback signal, to obtain the device information of the first antenna line device, for example, the port information and the device type information.

It should be understood that the detection device may send the detection signal and the feedback signal through independent channel control or by using an existing radio frequency sending feeder coupling channel, and these signals may be delivered by using a feeder or an AISG cable.

In this way, the detection device can obtain device information of all antenna line devices connected in series on the entire line and the device information of the antenna. The detection device may perform overall control based on the device information such as port information, to help with subsequent maintenance.

Figure 6:
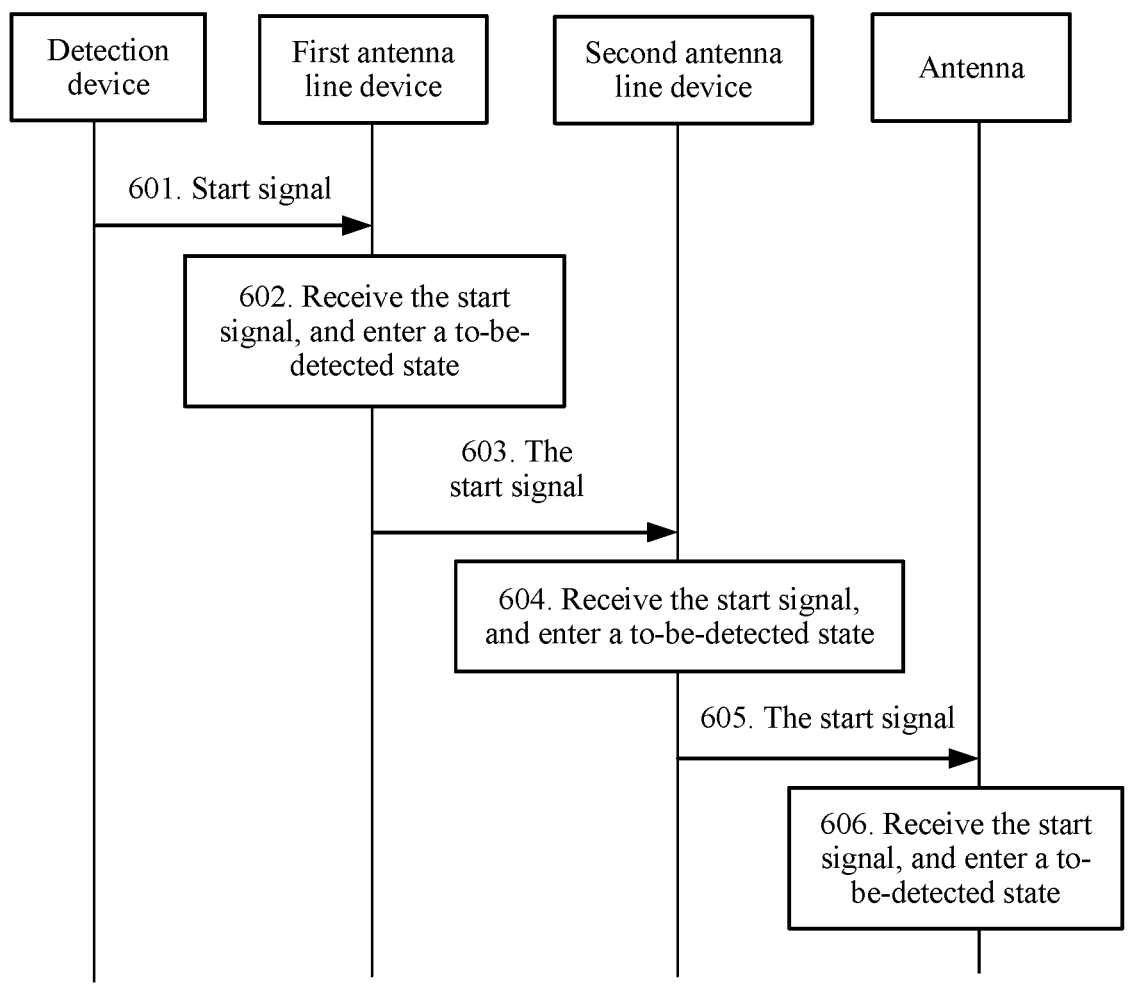
FIG. 6 is an interactive flowchart of a signal transmission method in a radio frequency network according to another embodiment of the present application.

Based on the solution described above, the detection device may obtain port information sent by each device from a radio frequency link, to obtain a cascading relationship between a plurality of levels of devices, and may detect port connection statuses of the devices on the radio frequency channel in a level-by-level manner In another embodiment, FIG. 6 shows a signal transmission method in a radio frequency network. Before each of the at least one antenna line device receives the detection signal from the detection device or the previous antenna line device connected in series to the antenna line device, in other words, before 301 and 501, the method may further include 601 to 606. Two antenna line devices, to be specific, the first antenna line device and the second antenna line device, are still used as an example.

601. The detection device sends a start signal to the first antenna line device.

602. The first antenna line device receives the start signal, and enters a to-be-detected state based on the start signal.

603. The first antenna line device forwards the start signal to the second antenna line device.

604. The second antenna line device receives the start signal from the detection device, and enters a to-be-detected state based on the start signal.

605. The second antenna line device forwards the start signal to the antenna.

606. The antenna receives the start signal from the detection device, and enters a to-be-detected state based on the start signal.

Further, the start signal includes a frequency band corresponding to a port used by the detection device to send the start signal. The frequency band is a to-be-detected frequency band. The method further includes the following steps.

607. Each antenna line device determines whether the antenna line device supports a frequency band corresponding to a port used by the detection device to send the start signal.

608. If the antenna line device supports the frequency band corresponding to the port, the antenna line device sends the start signal to the antenna or a next antenna line device connected in series to the antenna line device.

For example, after receiving the start signal, the first antenna line device sets a status of the first antenna line device to a to-be-detected state. The start signal includes frequency band information Fa, and the frequency band information Fa is the frequency band corresponding to the port used by the detection device to send the start signal.

The first antenna line device first determines whether the first antenna line device supports a frequency band Fa in the start signal. If the first antenna line device does not support the frequency band Fa, the start signal is not forwarded, and is directly discarded. If the first antenna line device supports the frequency band Fa, the first antenna line device performs matching on a splitter port of the first antenna line device based on the frequency band Fa, and forwards detection signal to the second antenna line device through the matched splitter port.

After receiving the start signal, the second antenna line device sets a status of the second antenna line device to a to-be-detected state, and determines whether the second antenna line device supports the frequency band Fa in the start signal. If the second antenna line device supports the frequency band Fa, the second antenna line device performs matching on a splitter port of the second antenna line device based on the frequency band Fa, and forwards detection signal to the antenna through the matched splitter port.

After receiving the start signal, a radio frequency port of the antenna sets a status of the antenna to a to-be-detected state.

In another embodiment, the detection signal includes an Antenna Interface Standards Group AISG detection signal used to detect an AISG channel, and port information of each antenna line device further includes:

a port number of a port of an AISG channel of the antenna line device, and a port number of an output end of the AISG channel of the antenna line device.

FIG. 7A and FIG. 7B and FIG. 8A and FIG. 8B are used as an example to describe in detail a signal transmission method in a radio frequency network according to an embodiment of the present application.

Figure 7A:
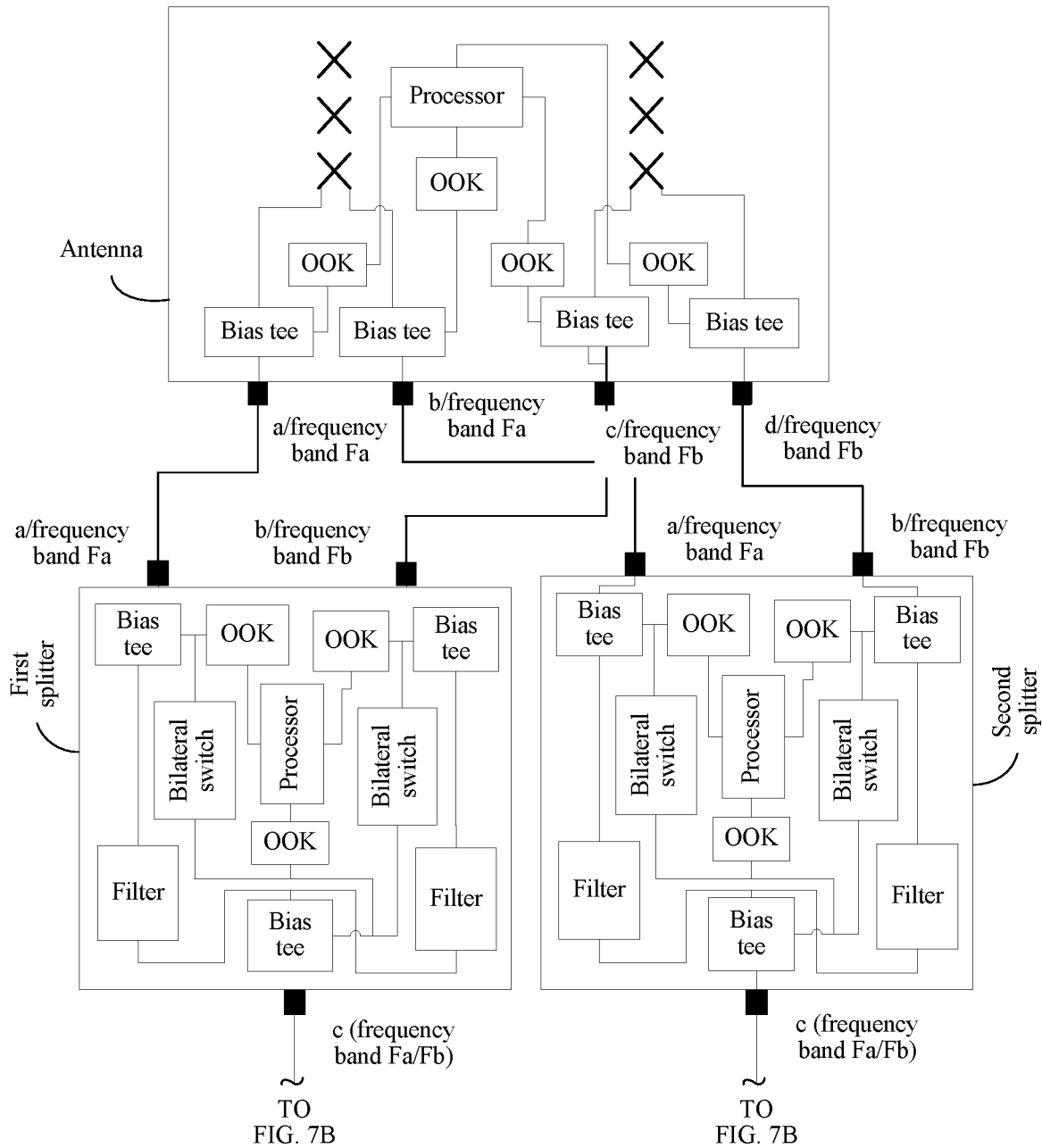
FIG. 7A and FIG. 7B are a schematic diagram of a connection between devices connected in series in a radio frequency network according to an embodiment of the present application.
Figure 7B:
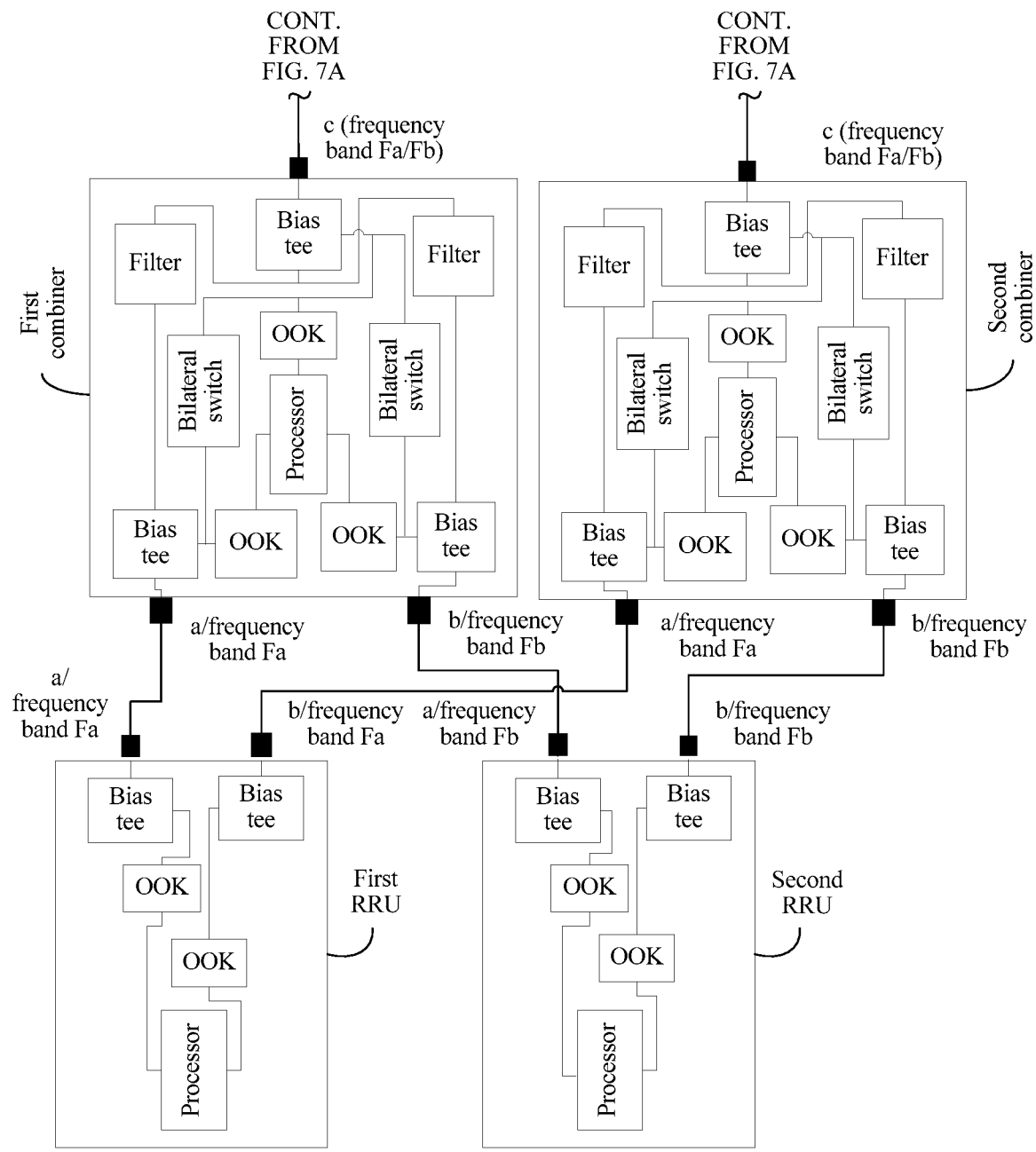

In FIG. 7A and FIG. 7B, a detection device is a radio remote unit (RRU), and an antenna line device includes a splitter and a combiner. FIG. 7A and FIG. 7B are a schematic diagram of a connection between devices connected in series in a radio frequency network according to an embodiment of the present application. A port a of a first RRU is used as an example for description, and a process of another port is the same as this port. According to FIG. 7A and FIG. 7B, and with reference to the methods shown in FIG. 3 to FIG. 6, two manners of obtaining port information and device type information of each device are described below.

Manner 1

701. A first RRU sends a detection start signal through a port a, where the signal includes a to-be-detected frequency band signal Fa.

702. After receiving the start signal, a first-level antenna line device, namely, a first combiner, sets a status of the first combiner to a to-be-detected state, where the start signal includes the frequency band signal Fa; and the first combiner learns, through comparison, that frequency of a receive port a is also Fa, and this indicates that the first combiner supports the frequency band. If the first combiner does not support the frequency band, the start signal is not forwarded to a next-level antenna line device; and if the first combiner supports the frequency band, the start signal is forwarded to a combiner port c of the first antenna line device.

703. After receiving the start signal at a combiner port, a second-level antenna line device, namely, a first splitter, sets a status of the first splitter to a to-be-detected state. The first splitter first determines whether the first splitter supports the frequency band Fa in the start signal. If the first splitter does not support the frequency band Fa, the start signal is not forwarded, and is directly discarded. If the first splitter supports the frequency band Fa, the first splitter performs matching on a splitter port of the first splitter based on the frequency band Fa, and forwards the signal to the splitter port. The frequency band herein is Fa, the first splitter supports the frequency band, and a corresponding splitter port is a.

704. After receiving the start signal, a radio frequency port of an antenna sets a status of the antenna to a to-be-detected state.

705. The first RRU sends, through the port a, a detection signal used to detect a first-level device, where the detection signal includes the frequency band signal Fa.

706. The first combiner is used as the first-level device, first receives the signal, and finds that the status of the first combiner is a to-be-detected state. This indicates that the first combiner needs to process and respond to the signal. It can be learned by parsing the detection signal that a detection device is detecting the first-level device. The first combiner sets the status of the first combiner to a detected state, and records the first combiner as the first-level device. Finally, the first combiner generates a feedback signal, and returns the feedback signal to the detection device, where the feedback signal includes: a device type of the first combiner: a combiner; input ports: a port a supporting a frequency band Fa and a port b supporting a frequency band Fb; and an output port: a port c supporting the frequency band Fa/Fb; and further includes a port number a of a port on which the detection signal is received and a corresponding output port number c.

707. After receiving the feedback signal of the first combiner on the port a, the first RRU can learn through parsing that a device type is a combiner, there are two input ports that support the frequency band Fa and the frequency band Fb, there is one output port supporting the frequency band Fa/Fb, a port receiving the detection signal is a, and a corresponding output port is c.

708. The first RRU sends, through the port a, a detection signal used to detect a second-level device.

709. After receiving the signal, the first-level device, namely, the first combiner finds that the status of the first combiner is a detected state, and the first combiner does not need to reply to the signal, but needs to forward the signal to a next-level device. Before forwarding the signal, the first combiner needs to recombine the detection signal, adds the port number a of the port used by the first combiner to receive the detection signal to the detection signal (so that a specific port to which a signal is forwarded from a device to a previous-level device is learned), and determines, based on the frequency band information in the detection signal and a frequency band corresponding to the receive port of the first combiner and with reference to a working principle of the combiner, that a port used to forward the signal to a next-level device is a port c.

710. After receiving the detection signal, the second-level device, namely, the first splitter, finds that the status of the first splitter is a to-be-detected state. This indicates that the first splitter needs to process and reply to the detection signal. It can be learned through parsing the signal that the detection device is detecting the second-level device. The first splitter sets the status of the first splitter to a detected state, and records the first splitter as the second-level device. Finally, the first splitter returns feedback information to the detection device, where the feedback signal includes: a device type of the first splitter: a splitter; an input port: a port c supporting a frequency band Fa/Fb; and output ports: a port a supporting the frequency band Fa and a port b supporting the frequency band Fb; and further includes a port number c of a port on which the detection signal is received and a corresponding output port number a. In addition, the feedback signal also includes port information of previous-level devices sent by all the previous-level devices.

711. After receiving, through the port c, the feedback signal returned by the first splitter, the first combiner needs to forward the feedback signal to the first RRU, and when parsing, from the feedback signal, the detection signal that is previously forwarded to the first splitter, the first combiner adds, to the detection signal, the port number a of the port used by the first combiner to receive the signal, and forwards the feedback signal to the port a.

712. After receiving the feedback signal through the port a, the first RRU learns through parsing that the second-level device is a splitter, there are two splitter ports that separately support the frequency band Fa and the frequency band Fb, there is one combiner port supporting the frequency band Fa/Fb, and an input port and an output port of the detection signal are c and a.

713. The first RRU sends, through the port a, a detection signal used to detect a third-level device.

714. A processing manner of the first combiner is the same as that in step 710.

715. A processing manner of the first splitter is similar to the processing manner of the first combiner. The port number c of the port used by the first splitter to receive the detection signal is added to the detection signal, and the detection signal is determined to be forwarded to the port a based on the frequency band information in the detection signal and a frequency band corresponding to the receive port c of the first splitter and with reference to the working principle of the splitter.

716. After receiving the detection signal, the third-level device, namely, the antenna, finds that the status of the antenna is a to-be-detected state, and the antenna needs to process and reply to the signal. It can be learned by parsing the detection signal that the detection device is detecting the third-level device. The antenna sets the status of the antenna to a detected state, and records the antenna as the third-level device. Finally, the antenna generates a feedback signal, and returns the feedback signal to the detection device, where the feedback signal includes: a device type of the antenna: an antenna; and input ports: a port a supporting the frequency band Fa, a port b supporting the frequency band Fa, a port c supporting the frequency band Fb, and a port d supporting the frequency band Fb; and further includes a port number a of a port on which the detection signal is received. In addition, the feedback signal also includes port information of previous-level devices sent by all the previous-level devices.

717. After receiving a feedback signal from a previous-level device, the first splitter parses the port c used by the first splitter to receive the detection signal, and forwards the signal to the port c.

718. A processing manner of the first combiner is the same as that in step 711.

719. The first RRU receives the feedback signal of the antenna through the port a, and learns through parsing that the third-level device is the antenna and a port used by the antenna to receive the detection signal is the port a, and learns a port quantity of the antenna and a frequency band of each port through parsing. Because the third-level device is the antenna, and an output port of the signal is not set in the feedback signal, the third-level device is a last-level device.

720. In this case, the detection device detects devices at three levels: the first combiner, the first splitter, and the antenna, and detects capabilities of the three devices. A radio frequency channel for connecting the first combiner, the first splitter, and the antenna in series is: the first RRU (the port a)→the first combiner (the port a-the port c)→the splitter (the port c-the port a)→the antenna (the port a).

Manner 2

801. A first RRU delivers a detection signal through a port a, where the signal includes a frequency band Fa of the port a of the first RRU.

802. A first combiner receives the detection signal on a splitter port a, recombines the detection signal, adds the following information to the detection signal: "a device type: a combiner; input ports: a port a supporting a frequency band Fa and a port b supporting a frequency band Fb; an output port: a port c supporting the frequency band Fa/Fb; and a port number a of a port on which the detection signal is received and a corresponding output port number c", and then forwards the recombined detection signal to a next-level device through the port c.

803. A first splitter receives the detection signal on a combiner port c. The first splitter recombines the detection signal, adds the following signal to the detection signal: "a device type: a splitter; an input port: a port c supporting the frequency band Fa/Fb; output ports: a port a supporting the frequency band Fa and a port b supporting the frequency band Fb; and a port number c of a port on which the detection signal is received and a corresponding output port number a", and then forwards the recombined signal to a next-level device through the port a.

804. An antenna receives the detection signal on the port a. The antenna also recombines the signal, and adds the following signal to the detection signal: "a device type: an antenna; input ports: a port a supporting the frequency band Fa, a port b supporting the frequency band Fa, a port c supporting the frequency band Fb, and a port d supporting the frequency band Fb; and a port number a of a port on which the detection signal is received". The antenna is a last-level device, and does not need to forward the detection signal to a next-level device, but needs to generate a feedback signal and return the feedback signal to the detection device. Therefore, the antenna sends the feedback signal to the first splitter through the port a.

805. The first splitter receives the feedback signal on the port a, and parses the receive port c of the first splitter that is previously added to the feedback signal, and the first splitter forwards the received feedback signal through the port c.

806. The first combiner receives the feedback signal on the port c, parses the receive port a of the first combiner that is previously added to the feedback signal, and forwards the received feedback signal through the port a.

807. The first RRU receives the feedback signal on the port a, and parses the feedback signal, to obtain a topology relationship of a radio frequency network connected to the port a, to be specific, devices at three levels: the combiner, the splitter, and the antenna, and capabilities of the three devices. A radio frequency channel for connecting the first combiner, the first splitter, and the antenna in series is: the first RRU (the port a)→the first combiner (the port a-the port c)→the splitter (the port c-the port a)→the antenna (the port a).

In this way, the detection device detects a topology relationship between a combiner and a splitter connected between a radio frequency port of the detection device and the antenna, and can clearly know a device type, a port signal, a port frequency band, and the like of each of the combiner, the splitter, and the antenna that are connected to the radio frequency port of the detection device.

Figure 8A:
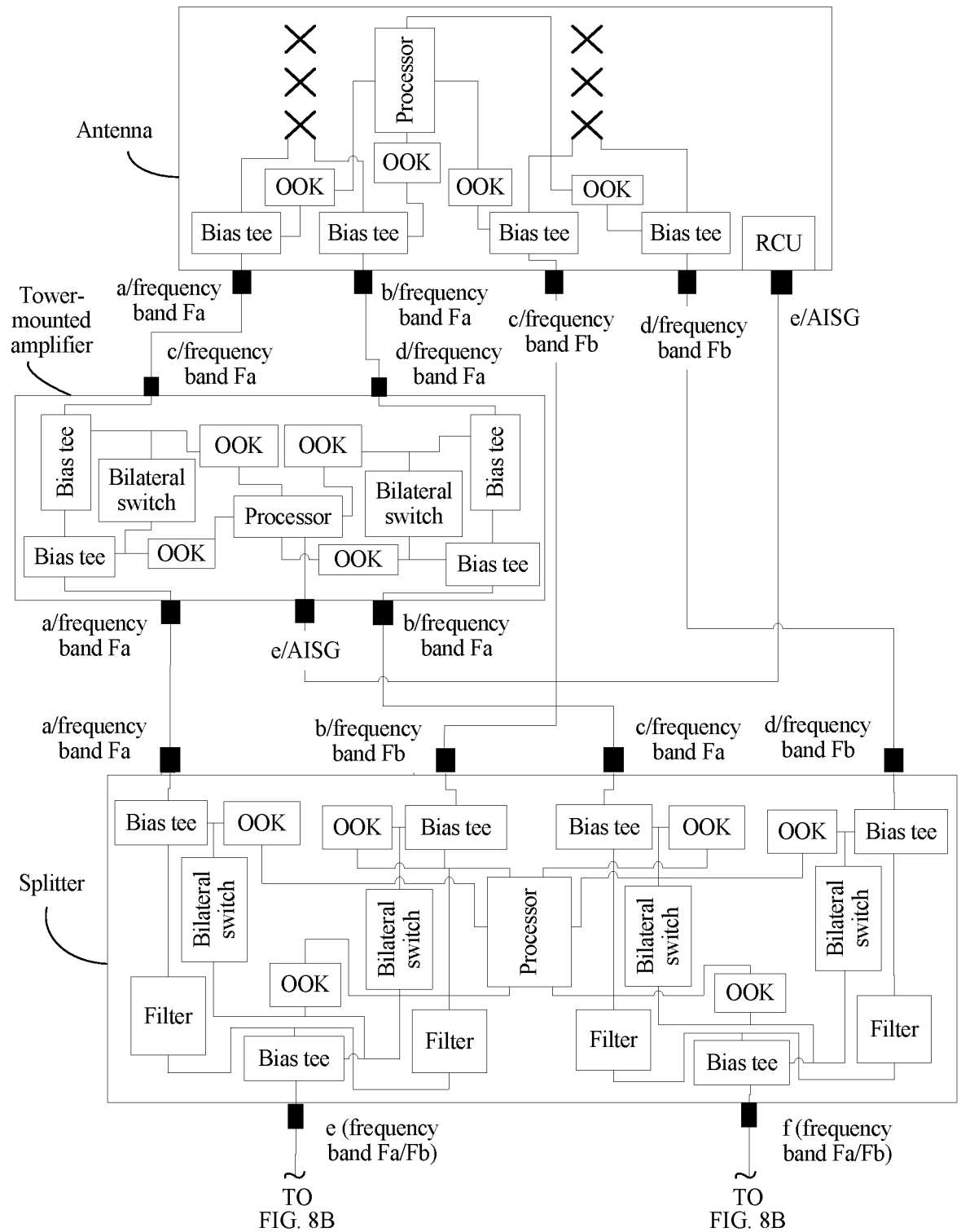
FIG. 8A and FIG. 8B are a schematic diagram of a connection between devices connected in series in a radio frequency network according to an embodiment of the present application.
Figure 8B:
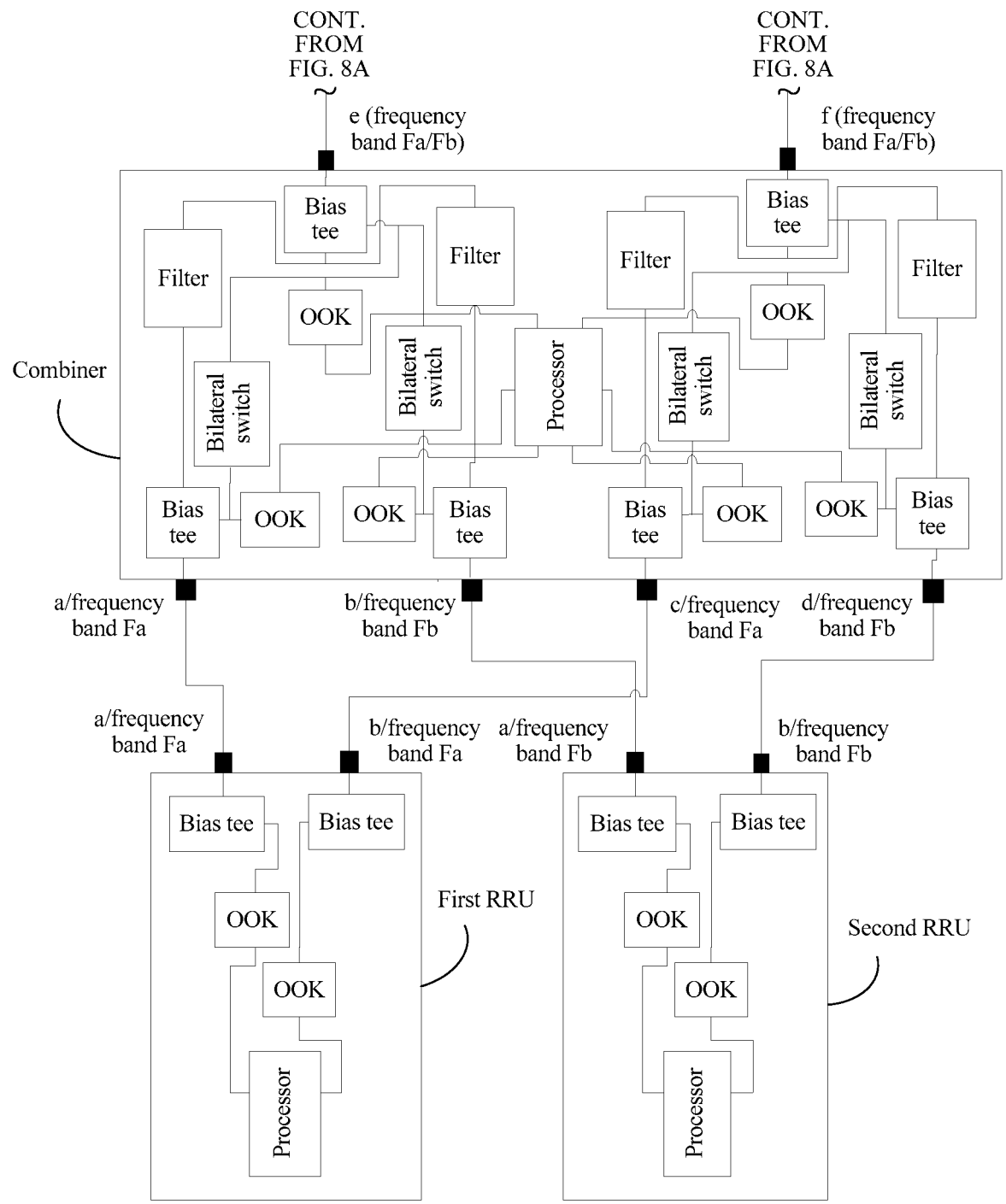

FIG. 8A and FIG. 8B are a schematic diagram of a connection between devices connected in series in a radio frequency network according to an embodiment of the present application. A port a of a first RRU is used as an example for description, and a process of another port is the same as this port. According to FIG. 8A and FIG. 8B, and with reference to the methods in FIG. 3 to FIG. 6, the following separately describes two cases: radio frequency channel detection and AISG channel detection. In FIG. 8A and FIG. 8B, a detection device is a radio remote unit, and an antenna line device includes a splitter, a combiner, and a tower-mounted amplifier (TMA for short below).

Case 1: Radio Frequency Channel

901. A first RRU sends a detection signal through a port a, where the detection signal includes a frequency band Fa of the port a of the first RRU.

902. A combiner receives the detection signal on a splitter port a, and the combiner recombines the detection signal, adds the following information to the detection signal: "a device type: a combiner; input ports: a port a supporting the frequency band Fa, a port b supporting a frequency band Fb, a port c supporting the frequency band Fa, and a port d supporting the frequency band Fb; output ports: a port e supporting a frequency band Fa/Fb and a port f supporting the frequency band Fa/Fb; and a port number a of a port on which the detection signal is received and a corresponding output port number e"; and then forwards the recombined detection signal to a next-level device through the port e.

903. A splitter receives the detection signal on a combiner port e, and the splitter recombines the detection signal, adds the following information to the detection signal: "a device type: a splitter; input ports: a port e supporting the frequency band Fa/Fb and a port f supporting the frequency band Fa/Fb; output ports: a port a supporting the frequency band Fa, a port b supporting the frequency band Fb, a port c supporting the frequency band Fa, and a port d supporting the frequency band Fb; and a port number e of a port on which the detection signal is received and a corresponding output port number a", and then forwards the recombined signal to a next-level device through the port a.

904. A TMA receives the detection signal on an input port a, and the TMA recombines the detection signal, adds the following information to the detection signal: "a device type: a TMA; input ports: a port a supporting the frequency band Fa and a port b supporting the frequency band Fa; input ports: a port c supporting the frequency band Fa and a port d supporting the frequency band Fa; a port a on which the detection signal is received and a corresponding output port c", and then forwards the recombined detection signal to a next-level device through the port c.

905. An antenna receives the detection signal on the port a. The antenna also recombines the signal, and adds the following information to the detection signal: "a device type: an antenna; input ports: a port a supporting the frequency band Fa, a port b supporting the frequency band Fa, a port c supporting the frequency band Fb, and a port d supporting the frequency band Fb; and a port number a of a port on which the detection signal is received". The antenna is a last-level device, and does not need to forward the detection signal to a next-level device, but needs to generate a feedback signal and return the feedback signal to the detection device. Therefore, the antenna returns the feedback signal to the TMA through the port a.

906. The TMA receives the feedback signal on the port c, parses the port a on which the detection signal is received and that is previously added to the feedback signal, and forwards the received feedback signal through the port a.

907. The splitter receives the feedback signal on the port a, parses the receive port e of the splitter that is previously added to the feedback signal, and forwards the received feedback signal through the port e.

908. The combiner receives the feedback signal on the port c, parses the receive port a of the combiner that is previously added to the signal, and forwards the received feedback signal through the port a.

909. The first RRU receives the feedback signal on the port a, and parses the signal, to obtain a topology relationship of a radio frequency network connected to the port a, to be specific, devices at four levels: the combiner, the splitter, the TMA, and the antenna, and capabilities of the four devices. A radio frequency channel for connecting the combiner, the splitter, the TMA, and the antenna in series is: the first RRU (the port a)→the combiner (the port a-the port e)→the splitter (the port e-the port a)→the TMA (the port a-the port c)→the antenna (the port a).

Case 2: AISG Channel

A detection method for the AISG channel is similar to that for the radio frequency channel, but data related to the AISG channel is included in a signal.

1001. A first RRU delivers an AISG detection signal through a port a, where the AISG detection signal includes a frequency band Fa of the port a of the first RRU.

1002. A combiner receives the AISG detection signal on a splitter port a, and the combiner recombines the AISG detection signal, adds the following information to the AISG detection signal: "a device type: a combiner; input ports: a port a supporting the frequency band Fa, a port b supporting a frequency band Fb, a port c supporting the frequency band Fa, and a port d supporting the frequency band Fb; output ports: a port e supporting the frequency band Fa/Fb and a port f supporting the frequency band Fa/Fb; and an input port number a of an AISG channel, a corresponding output port number e, and a receiving port a of the AISG detection signal", and then forwards the recombined detection signal to a next-level device through the port e.

1003. A splitter receives the AISG detection signal through a port e, and the splitter recombines the ASIG detection signal, adds the following signal to the AISG detection signal: "a device type: a splitter; input ports: a port e supporting the frequency band Fa/Fb and a port f supporting the frequency band Fa/Fb; output ports: a port a supporting the frequency band Fa, a port b supporting the frequency band Fb, a port c supporting the frequency band Fa, and a port d supporting the frequency band Fb; an input port number e of an AISG channel, a corresponding output port number a, and a receive port e that is of the AISG channel and that is used to receive the AISG detection signal, and then forwards the recombined AISG detection signal to a next-level device through the port a.

1004. A TMA receives the AISG detection signal on an input port a, and the TMA recombines the AISG detection signal, adds the following information to the AISG detection signal: "a device type: a TMA; input ports: a port a supporting the frequency band Fa and a port b supporting the frequency band Fa; input ports: a port c supporting the frequency band Fa and a port d supporting the frequency band Fa; an input port number a of an AISG channel and a corresponding output port number e; and a receive port a that is of the AISG channel and that is used to receive the AISG detection signal", and then forwards the recombined signal to a next-level device through the port e.

1005. An antenna receives the AISG detection signal through a port e, and the antenna also recombines the AISG detection signal, and adds the following information to the AISG detection signal: "a device type: an antenna; supported frequency bands: Fa and Fb". The antenna is a last-level device, does not need to forward the AISG detection signal to a next-level device, and does not first generate a feedback signal for the detection device. Therefore, the antenna sends the feedback signal to the TMA through the port e.

1006. The TMA receives the feedback signal on the port e, parses the receive port a of the TMA that is previously added to the feedback signal, and forwards the received feedback signal through the port a.

1007. The splitter receives the feedback signal on the port a, parses the receive port e of the splitter that is previously added to the feedback signal, and forwards the received feedback signal through the port e.

1008. The combiner receives the feedback signal on the port c, parses the receive port a of the combiner that is previously added to the feedback signal, and forwards the received feedback signal through the port a.

1009. The first RRU receives the feedback signal on the port a, and parses the feedback signal, to obtain a topology relationship of the AISG channel connected to the port a, to be specific, devices at four levels: the combiner, the splitter, the TMA, and the antenna, and capabilities of the four devices. The AISG channel for connecting the combiner, the splitter, the TMA, and the antenna in series is: the first RRU (the port a)→the combiner (the port a-the port e)→the splitter (the port e-the port a)→the TMA (the port a-the port e)→the antenna (the port e).

Therefore, the detection device can obtain the port information and the device type information of each device on a radio frequency channel, to obtain a radio frequency channel connection status of the devices, and can further detect an AISG channel connection status of the devices.

It should be understood that the detection device, the antenna line device, and the antenna shown in FIG. 7A and FIG. 7B and FIG. 8A and FIG. 8B may each include a central processing unit (CPU) and an OOK modulation circuit. In the detection device, the antenna line device, and the antenna, for hardware, an OOK modulation/demodulation circuit may be added at a port of each device, so that the detection signal and the feedback signal can be coupled to an original radio frequency channel, to transmit the detection signal and the feedback signal, and each device can receive and send the detection signal and the feedback signal.

It should be further understood that the detection device, the antenna line device, and the antenna may transmit the detection signal and the feedback signal through an existing radio frequency sending feeder coupling channel, and may alternatively transmit the detection signal and the feedback signal through an independent channel. The detection signal may be delivered by using a feeder or an AISG cable.

It should be further understood that the detection signal and the feedback signal in this embodiment of the present application may be digital information, an analog signal, or the like.

It should be further understood that in a process of sending the detection signal, each antenna line device needs to add port information of the antenna line device. The port information includes a port number of a port used to receive a detection signal sent by a previous antenna line device connected in series to the antenna line device, and a port number of a port used to send the detection signal to a next antenna line device connected in series to the antenna line device. The two ports used to receive the detection signal and used to send the detection signal may further be indicated to a next antenna line device by changing a port status, for example, the port status is different from a status of another port (a level of the port is changed to a level different from a level of the another port).

It should be further understood that in this embodiment of the present application, the detection device, the at least one antenna line device, and the antenna that are connected in series by using the radio frequency channel are described for a line including currently detected devices, for example, a line including the first RRU, the first combiner, the first splitter, and the antenna in FIG. 8A and FIG. 8B. In an entire radio frequency network, there may be a plurality of serial connection lines between the detection device and the antenna, for example, in FIG. 8A and FIG. 8B, the first RRU, the first combiner, the first splitter, and the antenna form a serial connection line, and a second RRU, a second combiner, a second splitter, and the antenna form another serial connection line.

An embodiment of the present application further provides a radio frequency system, where the radio frequency system includes a detection device, at least one antenna line device, and an antenna that are sequentially connected in series by using a radio frequency channel, and each of the at least one antenna line device is configured to:

receive a detection signal from the detection device or a previous antenna line device connected in series to the antenna line device; and add device type information and port information of the antenna line device to the received detection signal, and send, to the antenna or a next antenna line device connected in series to the antenna line device, the detection signal to which the device type information and the port information are added.

Herein, two antenna line devices are used as an example. The detection device sends the detection signal to a first antenna line device. After receiving the detection signal, the first antenna line device adds port information and device type information of the first antenna line device to the detection signal, and forwards, to a second antenna line device, the detection signal to which the port information and the device type information of the first antenna line device are added. After receiving the detection signal forwarded by the first antenna line device, the second antenna line device adds port information and device type information of the second antenna line device to the detection signal, and forwards, to the antenna, the detection signal to which the port information and the device type information of the second antenna line device are added. After receiving the detection information, the antenna adds port information of the antenna to the detection signal, and generates a feedback signal. The feedback signal includes the port information and the device type information of the first antenna line device, the port information and the device type information of the second antenna line device, and the port information and the device type information of the antenna.

The port information of the first antenna line device includes a port number a of a port used by the first antenna line device to receive the detection signal and a port number c of a port used by the first antenna line device to send the detection signal to the second antenna line device. The port information of the second antenna line device includes a port number c of a port used by the second antenna line device to receive the detection signal and a port number a of a port used by the second antenna line device to send the detection signal to the antenna. The port information of the antenna includes a port number a of a port used by the antenna to receive the detection signal.

Further, port information of each antenna line device or the antenna may further include a port number of each of a plurality of ports of the antenna line device or the antenna and a frequency band corresponding to each port.

After receiving the detection signal, the antenna generates the feedback signal. The feedback signal includes port information and device type information of each antenna line device and the antenna. The antenna sends the feedback signal to the second antenna line device by using an original path. After receiving the detection signal, the second antenna line device sends the feedback signal to the first antenna line device by using an original path, and the first antenna line device sends the feedback signal to the detection device by using an original path. In this way, the detection device can obtain a port connection relationship between devices on an entire radio frequency line, to detect the radio frequency network based on the information.

Figure 9:
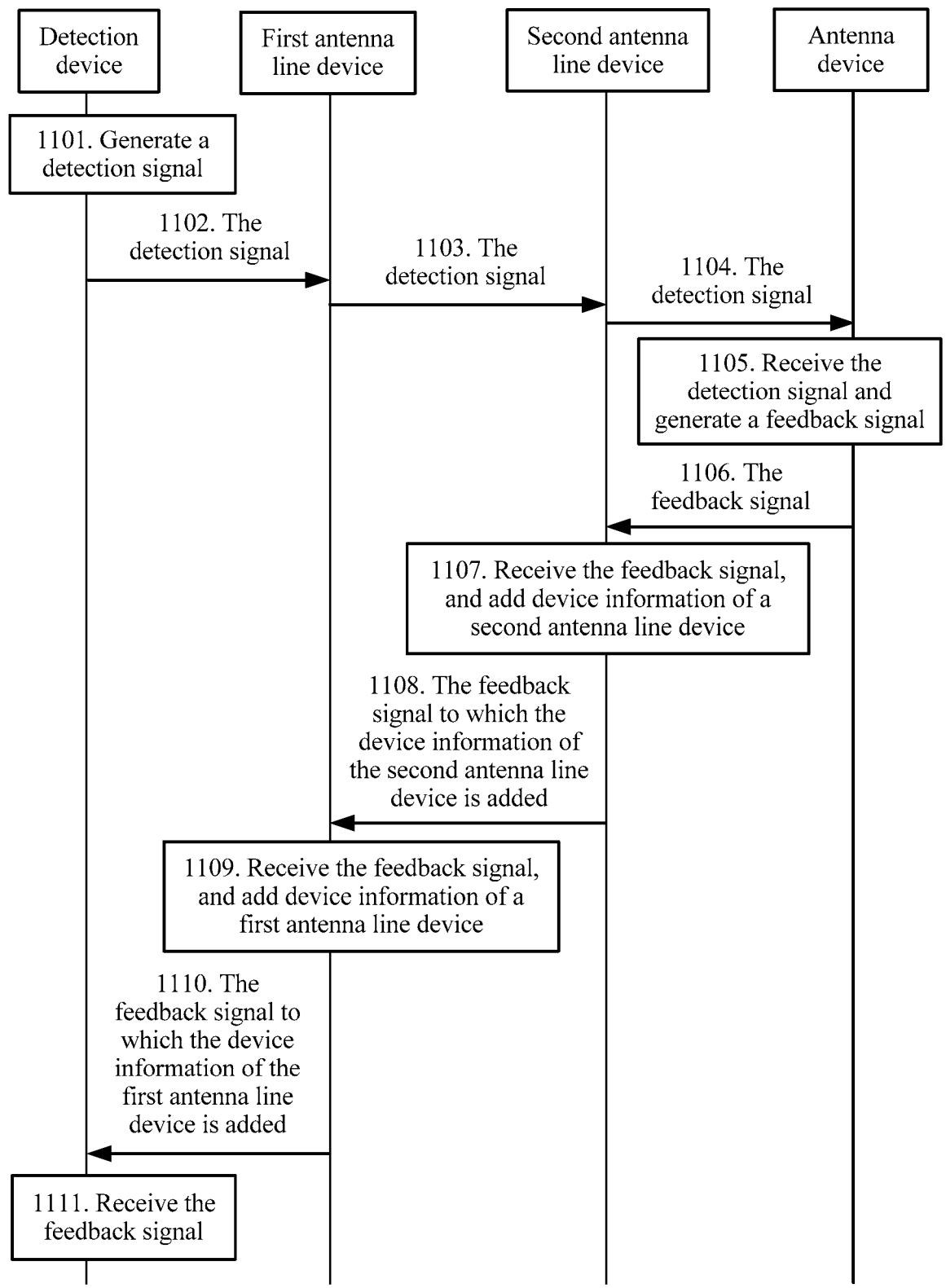
FIG. 9 is an interactive flowchart of a signal transmission method in a radio frequency network according to another embodiment of the present application.

FIG. 9 is an interactive flowchart of a signal transmission method in a radio frequency network according to another embodiment of the present application. The radio frequency network in this embodiment of the present application may include a detection device, at least one antenna line device, and an antenna. The detection device, the at least one antenna line device, and the antenna are sequentially connected in series by using a radio frequency channel. The detection device may be configured to generate a detection signal, and the antenna may be configured to generate a feedback signal corresponding to the detection signal.

In the method described in FIG. 3 and FIG. 4, each antenna line device adds device information of the antenna line device to the detection signal in a process of forwarding the detection signal. However, different from the method in FIG. 3 and FIG. 4, FIG. 9 shows another manner. To be specific, each antenna line device adds device information of the antenna line device to the feedback signal when forwarding the feedback signal, in other words, each antenna line device adds the device information of the antenna line device to the feedback signal when receiving the feedback signal returned by the antenna or a next antenna line device connected in series to the antenna line device, and returns, to the detection device or a previous antenna line device connected in series to the antenna line device, the feedback signal to which the device information is added.

FIG. 9 is described by using an example in which two antenna line devices are included: a first antenna line device and a second antenna line device. However, the present application is not limited thereto. More antenna line devices may be included, or only one antenna line device may be included. The detection device, the first antenna line device, the second antenna line device, and the antenna are sequentially connected in series by using the radio frequency channel. In this embodiment, the radio frequency network includes the detection device, the at least one antenna line device, and the antenna that are sequentially connected in series by using the radio frequency channel. The detection device is configured to generate the detection signal, the antenna is configured to generate the feedback signal for the detection signal, and the at least one antenna line device is configured to forward the detection signal between the detection device and the antenna. Each of the at least one antenna line device receives the feedback signal from the antenna or a previous antenna line device connected in series to the antenna line device; and each antenna line device adds device information of the antenna line device to the received feedback signal, and sends, to the detection device or a next antenna line device connected in series to the antenna line device, the feedback signal to which the device information is added.

In this solution, the detection device can obtain port information and device type information of each of devices connected in series on a radio frequency line, to determine whether a connection relationship between the devices is correct, and determine, when a connection error occurs, a specific port location at which the error occurs.

As shown in FIG. 9, the signal transmission method in the radio frequency network includes the following steps.

1101. The detection device generates a detection signal, where the detection signal includes a frequency band corresponding to a port used by the detection device to send the detection signal.

Specifically, the detection device may initiate detection on any line in the radio frequency network, and lines may be corresponding to different ports on the detection device. The detection device sends, for a to-be-detected line through a port, the detection signal to the antenna line device on the port.

1102. The detection device sends the detection signal to the first antenna line device.

For example, the detection signal includes a port number a1 of the port used by the detection device to send the detection signal and a corresponding frequency band Fa.

1103. The first antenna line device receives the detection signal from the detection device, and forwards the detection signal to the second antenna line device.

For example, the first antenna line device adds, to the detection signal, a port number a2 of a port used to receive the detection signal and a port number c1 of a port used by the first antenna line device to send the detection signal to the second antenna line device, and forwards the detection signal to a next-level device, to be specific, the second antenna line device.

1104. The second antenna line device receives the detection signal sent by the first antenna line device, and forwards the detection signal to the antenna.

For example, the second antenna line device adds, to the detection signal received from the first antenna line device, a port number c2 of a port used to receive the detection signal and a port number a3 of a port used by the second antenna line device to send the detection signal to the antenna, and forwards the detection signal to a next-level device, to be specific, the antenna.

1105. The antenna receives the detection signal sent by the second antenna line device, and generates a feedback signal.

The feedback signal includes device information of the antenna. For example, the device information of the antenna may include port information of the antenna, or include port information of the antenna and device type information of the antenna.

1106. The antenna sends the feedback signal to the second antenna line device.

It should be noted that a port used by the antenna to send the feedback signal is a port used by the antenna to receive the detection signal.

1107. The second antenna line device receives the feedback signal from the antenna, and adds device information of the second antenna line device to the received feedback signal.

The device information of the second antenna line device may include, for example, port information of the second antenna line device, or include port information of the second antenna line device and device type information of the second antenna line device.

A port used by the second antenna line device to receive the feedback signal sent by the antenna is a port used by the second antenna line device to send the detection signal to the antenna.

1108. The second antenna line device sends, to the first antenna line device, the feedback signal to which the device information of the second antenna line device is added.

A port used by the second antenna line device to send the feedback signal to the first antenna line device is a port used by the second antenna line device to receive the detection signal from the first antenna line device.

1109. The first antenna line device receives the feedback signal sent by the second antenna line device, and adds device information of the first antenna line device to the received feedback signal.

The device information of the first antenna line device may include, for example, port information of the first antenna line device, or include port information of the first antenna line device and device type information of the first antenna line device.

A port used by the first antenna line device to receive the feedback signal sent by the second antenna line device is a port used by the first antenna line device to send the detection signal to the second antenna line device.

1110. The first antenna line device sends, to the detection device, the feedback signal to which the device information of the first antenna line device is added.

A port used by the first antenna line device to send the feedback signal to the detection device is a port used by the first antenna line device to receive the detection signal from the detection device.

1111. The detection device receives the feedback signal sent by the first antenna line device.

Because each antenna line device adds device information of the antenna line device to the received feedback signal, and sends, to the detection device or a previous antenna line device connected in series to the antenna line device, the feedback signal to which the device information is added, the feedback signal finally received by the detection device includes device information of all antenna line devices connected in series and the device information of the antenna.

Optionally, the device information of each antenna line device includes port information of the antenna line device, or includes port information of the antenna line device and device type information of the antenna line device.

Optionally, the port information of each antenna line device includes a port number of a port used by the antenna line device to receive the detection signal, and a port number of a port used by the antenna line device to send the detection signal.

For example, as shown in FIG. 9, the feedback signal finally received by the detection device includes: the port number of the port used by the detection device to send the detection signal; the port number of the port used by the first antenna line device to receive the detection signal and the port number of the port used to send the detection signal; the port number of the port used by the second antenna line device to receive the detection signal and the port number of the port used to send the detection signal; and the port number of the port used by the antenna to receive the detection signal. In this way, the antenna line device can forward the feedback signal to the detection device by using an original path.

Optionally, the port information of each antenna line device may further include port information of each of a plurality of ports of the antenna line device.

Based on the foregoing descriptions, based on the detection device, the at least one antenna line device, and the antenna connected in series by using the radio frequency channel, in a process of transmitting the detection signal generated by the detection device, the antenna line device may add the device type information and the port information of the antenna line device to the detection signal; or in a process of transmitting feedback information generated by the antenna, the antenna line device adds the device type information and the port information of the antenna line device to the feedback information.

In addition, the detection device may obtain port information and device type information of each antenna line device, and the port information and the device type information of the antenna from the device; or the detection device may obtain port information and device type information of all antenna line devices, and the port information and the device type information of the antenna at a time.

Figure 10:
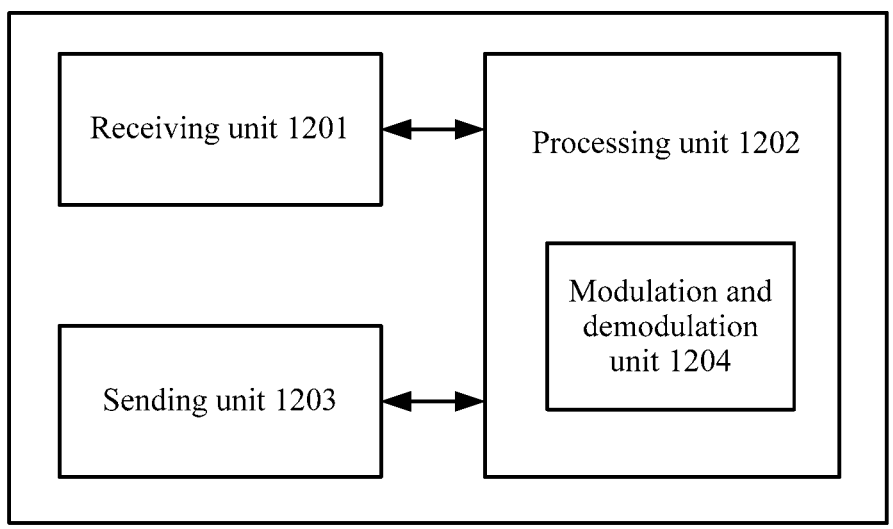
FIG. 10 is a schematic structural diagram of an antenna line device according to an embodiment of the present application.

FIG. 10 is a schematic structural diagram of an antenna line device according to an embodiment of the present application. The antenna line device may perform the method in the foregoing method embodiments in FIG. 3 to FIG. 9. An antenna line device 1200 includes a receiving unit 1201, a processing unit 1202, and a sending unit 1203.

The receiving unit 1201 may be configured to receive a detection signal and a feedback signal. The processing unit 1302 may be configured to add device type information and port information to the detection signal or the feedback signal. The sending unit 1203 may be configured to forward the detection signal and the feedback signal.

It should be understood that the processing unit 1202 may include a modulation/demodulation unit 1204, configured to: demodulate the received detection signal and the feedback signal, and modulate the sent detection signal and the sent feedback signal, to form a modulation signal, so that the detection signal and the feedback signal may be coupled to a radio frequency channel for transmission.

For example, a detection device generates a detection signal, and the detection signal is a modulation signal generated by a modulation/demodulation circuit in the detection device. The detection device couples the modulation signal to a radio frequency signal, to obtain a coupled signal, and transmits the coupled signal to the antenna line device 1200 through a radio frequency port. The receiving unit 1201 receives the coupled signal through the radio frequency port. The modulation/demodulation unit 1204 demodulates the coupled signal, and obtains the detection signal from the coupled signal through separation. The processing unit 1202 generates a feedback signal based on the detection signal. The modulation/demodulation unit 1204 modulates the feedback signal. The sending unit 1203 returns the modulated feedback signal to the detection device.

The antenna line device 1200 according to this embodiment of this application may be corresponding to the signal transmission method according to the embodiment of this application. In addition, units and/or modules in the antenna line device 1200 are separately configured to implement steps in FIG. 3 to FIG. 9 or in any signal transmission method in a radio frequency network described above. For brevity, details are not described herein.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in various embodiments of the present application. The execution sequences of the processes should be determined according to functions and internal logic of the processes, and should not be construed as any limitation on the implementation processes of the embodiments of the present application.

A person of ordinary skill in the art may be aware that, the units and steps in the examples described with reference to the embodiments disclosed herein may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present application.

It may be clearly understood by a person skilled in the art that, for the purpose of convenient and brief description, for a detailed working process of the foregoing system, apparatus, and unit, refer to a corresponding process in the foregoing method embodiments, and details are not described herein.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments of the present application.

In addition, functional units in the embodiments of the present application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present application essentially, or the part contributing to the prior art, or all or a part of the technical solutions may be implemented in the form of a software product. The software product is stored in a storage medium and includes several instructions for instructing a computer device (which may be a personal computer, a server, a network device, or the like) to perform all or a part of the steps of the methods described in the embodiments of the present application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific embodiments of the present application, but are not intended to limit the protection scope of the present application. Any modification or replacement readily figured out by a person skilled in the art within the technical scope disclosed in the present application shall fall within the protection scope of the present application. Therefore, the protection scope of the present application shall be subject to the protection scope of the claims.

What is claimed is:

1. A radio frequency system, wherein the radio frequency system comprises a detection device, at least one antenna line device, and an antenna that are sequentially connected in series by using a radio frequency channel, and each of the at least one antenna line device is configured to:
  receive a detection signal from the detection device or a previous antenna line device connected in series to the antenna line device; and
  add device information of the antenna line device to the received detection signal, and send, to the antenna or a next antenna line device connected in series to the antenna line device, the detection signal to which the device information is added.

2. The system according to claim 1, wherein the antenna line device is further configured to:
  receive a feedback signal from the antenna, wherein the feedback signal comprises device information of the at least one antenna line device and device information of the antenna; and
  send the feedback signal to the detection device.

3. The system according to claim 1, wherein the device information of the antenna line device comprises port information of the antenna line device, or comprises port information of the antenna line device and device type information of the antenna line device.

4. The system according to claim 1, wherein the port information of the antenna line device comprises:
a port number of a port used by the antenna line device to receive the detection signal, and a port number of a port used by the antenna line device to send the detection signal.

5. The system according to claim 4, wherein the port information of the antenna line device further comprises:
a port number of each of a plurality of ports of the antenna line device and a frequency band corresponding to each port.

6. The system according to claim 1, wherein before each of the at least one antenna line device receives the detection signal from the detection device or the previous antenna line device connected in series to the antenna line device, the antenna line device is further configured to:
receive a start signal from the detection device; and
enter a to-be-detected state based on the start signal.

7. The system according to claim 6, wherein the start signal comprises a frequency band corresponding to a port used by the detection device to send the start signal, and the antenna line device is further configured to:
determine whether the antenna line device supports the frequency band; and
if the antenna line device supports the frequency band, send the start signal to the antenna or the next antenna line device connected in series to the antenna line device.

8. The system according to claim 1, wherein the detection signal comprises an Antenna Interface Standards Group (AISG) detection signal used to detect an AISG channel, and the port information of the antenna line device further comprises:
a port number of a port of an AISG channel of the antenna line device, and a port number of an output end of the AISG channel of the antenna line device.

9. The system according to claim 1, wherein the antenna line device comprises a splitter, a combiner, a tower-mounted amplifier, a coupler, or a transmission unit corresponding to the antenna line device, the transmission unit corresponding to the antenna line device and the antenna line device use a same port, and the transmission unit is configured to transmit the detection signal and the feedback signal.

10. A radio frequency system, wherein the radio frequency system comprises a detection device, at least one antenna line device, and an antenna that are sequentially connected in series by using a radio frequency channel, the detection device is configured to generate a detection signal, the antenna is configured to generate a feedback signal for the detection signal, the at least one antenna line device is configured to forward the detection signal between the detection device and the antenna, and each of the at least one antenna line device is configured to:
receive the feedback signal from the antenna or a previous antenna line device connected in series to the antenna line device; and
add device information of the antenna line device to the received feedback signal, and send, to the detection device or a next antenna line device connected in series to the antenna line device, the feedback signal to which the device information is added.

11. The system according to claim 10, wherein the device information of the antenna line device comprises port information of the antenna line device, or comprises port information of the antenna line device and device type information of the antenna line device.

12. The system according to claim 11, wherein the port information of the antenna line device comprises:
a port number of a port used by the antenna line device to receive the detection signal, and a port number of a port used by the antenna line device to send the detection signal.

13. The system according to claim 10, wherein before each of the at least one antenna line device receives the feedback signal from the antenna or the previous antenna line device connected in series to the antenna line device, the antenna line device is further configured to:
receive a start signal from the detection device; and
enter a to-be-detected state based on the start signal.

14. The system according to claim 13, wherein the start signal comprises a frequency band corresponding to a port used by the detection device to send the start signal, and the antenna line device is further configured to:
determine whether the antenna line device supports the frequency band; and
if the antenna line device supports the frequency band, send the start signal to the antenna or the next antenna line device connected in series to the antenna line device.

15. The system according to claim 10, wherein the detection signal comprises an Antenna Interface Standards Group (AISG) detection signal used to detect an AISG channel, and the port information of the antenna line device further comprises:
a port number of a port of an AISG channel of the antenna line device, and a port number of an output end of the AISG channel of the antenna line device.

16. The system according to claim 10, wherein the antenna line device comprises a splitter, a combiner, a tower-mounted amplifier, a coupler, or a transmission unit corresponding to the antenna line device, the transmission unit corresponding to the antenna line device and the antenna line device use a same port, and the transmission unit is configured to transmit the detection signal and the feedback signal.

* * * * *

UNITED STATES PATENT AND TRADEMARK OFFICE
CERTIFICATE OF CORRECTION

PATENT NO. : 11,038,280 B2
APPLICATION NO. : 16/381117
DATED : June 15, 2021
INVENTOR(S) : Hu Zhao Page 1 of 1

It is certified that error appears in the above-identified patent and that said Letters Patent is hereby corrected as shown below:

On the Title Page

Column 2, (57), Abstract, replace ""The detection device obtain device information of each of devices connected in series on a radio frequency line;" with "The detection device obtains device information of each of the devices connected in series on a radio frequency line."

Signed and Sealed this
Fifth Day of October, 2021

Drew Hirshfeld
*Performing the Functions and Duties of the*
*Under Secretary of Commerce for Intellectual Property and*
*Director of the United States Patent and Trademark Office*